(12) United States Patent
Yoshida

(10) Patent No.: US 10,862,148 B2
(45) Date of Patent: Dec. 8, 2020

(54) VEHICLE POWER SOURCE SYSTEM

(71) Applicant: NISSAN MOTOR CO., LTD., Yokohama (JP)

(72) Inventor: Hideo Yoshida, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/630,973

(22) PCT Filed: Aug. 14, 2017

(86) PCT No.: PCT/JP2017/029319
§ 371 (c)(1),
(2) Date: Jan. 14, 2020

(87) PCT Pub. No.: WO2019/035172
PCT Pub. Date: Feb. 21, 2019

(65) Prior Publication Data
US 2020/0227761 A1 Jul. 16, 2020

(51) Int. Cl.
*H01M 8/04858* (2016.01)
*H01M 8/04302* (2016.01)
(Continued)

(52) U.S. Cl.
CPC ......... *H01M 8/04888* (2013.01); *B60L 50/60* (2019.02); *B60L 50/70* (2019.02);
(Continued)

(58) Field of Classification Search
CPC ......... H01M 8/04888; H01M 8/04302; H01M 8/04365; H01M 8/04552; H01M 8/04626;
(Continued)

(56) References Cited

U.S. PATENT DOCUMENTS

| 8,773,065 B2 | 7/2014 | Ang |
| 2003/0029654 A1 | 2/2003 | Shimane et al. |

(Continued)

FOREIGN PATENT DOCUMENTS

| JP | 2003-61209 A | 2/2003 |
| JP | 2004-234907 A | 8/2004 |

(Continued)

*Primary Examiner* — Michael R. Fin
(74) *Attorney, Agent, or Firm* — Foley & Lardner LLP

(57) ABSTRACT

Provided is a vehicle power source system including: a main battery configured to supply power to a drive motor of a vehicle; a fuel cell configured to supply power at least to the main battery; a main line connecting the main battery and the fuel cell; a first voltage translator placed on the main line and including a charging portion and a voltage transforming portion, the first voltage translator being configured to adjust an output voltage of the fuel cell; a relay provided between the charging portion and the fuel cell in the main line; and a sub-battery connected to an auxiliary machine power supply line via which power is supplied to an auxiliary machine of the vehicle or the fuel cell. The vehicle power source system includes a second voltage translator connected between the relay and the charging portion in the main line and configured to adjust power to be supplied from the sub-battery to the charging portion.

18 Claims, 15 Drawing Sheets

(51) Int. Cl.
- *B60L 53/54* (2019.01)
- *B60L 50/60* (2019.01)
- *B60L 53/62* (2019.01)
- *B60L 50/70* (2019.01)
- *B60L 58/40* (2019.01)
- *B60L 58/31* (2019.01)
- *H01M 10/44* (2006.01)
- *H01M 16/00* (2006.01)
- *H02J 7/00* (2006.01)
- *H02J 7/34* (2006.01)
- *H01M 8/0432* (2016.01)
- *H01M 8/04537* (2016.01)

(52) U.S. Cl.
CPC ............ *B60L 53/54* (2019.02); *B60L 53/62* (2019.02); *B60L 58/40* (2019.02); *H01M 8/04302* (2016.02); *H01M 8/04365* (2013.01); *H01M 8/04552* (2013.01); *H01M 8/04626* (2013.01); *H01M 8/04932* (2013.01); *H01M 10/44* (2013.01); *H01M 16/006* (2013.01); *H02J 7/007* (2013.01); *H02J 7/34* (2013.01); *H01M 2220/20* (2013.01); *H01M 2250/20* (2013.01)

(58) Field of Classification Search
CPC ............ H01M 8/04932; H01M 10/44; H01M 16/006; H01M 2220/20; B60L 53/54; B60L 50/60; B60L 58/40; B60L 58/31; H02J 7/007; H02J 7/34
USPC .......................................... 307/10.1
See application file for complete search history.

(56) References Cited

U.S. PATENT DOCUMENTS

| | | |
|---|---|---|
| 2007/0264547 A1 | 11/2007 | Ojima et al. |
| 2016/0248107 A1* | 8/2016 | Matsumoto ............ B60L 58/12 |
| 2016/0325636 A1* | 11/2016 | Masuda ................. B60L 58/18 |
| 2017/0240050 A1* | 8/2017 | Oya ........................ B60L 58/40 |
| 2018/0229771 A1* | 8/2018 | Sekine .................... B60K 1/04 |

FOREIGN PATENT DOCUMENTS

| | | |
|---|---|---|
| JP | 2007-305372 A | 11/2007 |
| JP | 2008-17576 A | 1/2008 |
| JP | 2008-84628 A | 4/2008 |
| JP | 2011-10508 A | 1/2011 |
| WO | WO 2012/063331 A1 | 5/2012 |
| WO | WO 2017/104257 A1 | 6/2017 |

* cited by examiner

VEHICLE POWER SOURCE SYSTEM

TECHNICAL FIELD

This invention particularly relates to a vehicle power source system used for a vehicle equipped with a fuel cell.

BACKGROUND ART

A power source system for a vehicle equipped with a fuel cell includes a main battery configured to supply power to a drive motor of the vehicle, and a sub-battery configured to supply power to an auxiliary machine of the vehicle or the fuel cell. A main line that connects the main battery and the fuel cell is provided with a DC/DC converter as a voltage translator. The DC/DC converter performs a boost control on a voltage of the fuel cell and supplies it to a strong electricity system in which the main battery is placed.

The vehicle power source system is provided with a relay between the DC/DC converter and the fuel cell. When the fuel cell is started, the relay is closed, so that power is suppliable from the fuel cell to the main battery via the DC/DC converter.

Here, at the time when the relay is closed, a rush current may be caused due to a voltage difference between the strong electricity system on the main battery side and the fuel cell. A technique to restrain such a rush current has been known. JP 2008-84628 A discloses a technique in which, at the time of closing a relay, a voltage difference between a fuel cell and a main battery is controlled by a DC/DC converter, so that a rush current is restrained.

SUMMARY OF INVENTION

However, the DC/DC converter between the fuel cell and the main battery is formed with a large size because a high output is requested, and therefore, the number of components such as elements and wiring lines that constitute the DC/DC converter is large. Accordingly, in a case where a potential difference is adjusted by operating the DC/DC converter to restrain the rush current, it is necessary to adjust a current flowing through many elements and wiring lines constituting a circuit of the DC/DC converter, so that a power loss is large.

The present invention has been accomplished in consideration of such a circumstance, and an object of the present invention is to provide a vehicle power source system that can restrain a power loss and restrain occurrence of a rush current.

According to one aspect of the present invention, a vehicle power source system is provided. The vehicle power source system includes a main battery configured to supply power to a drive motor of a vehicle a fuel cell configured to supply power at least to the main battery, a main line connecting the main battery and the fuel cell, a first voltage translator placed on the main line and including a charging portion and a voltage transforming portion, the first voltage translator being configured to adjust an output voltage of the fuel cell, a relay provided between the charging portion and the fuel cell in the main line; and a sub-battery connected to an auxiliary machine power supply line via which power is supplied to an auxiliary machine of the vehicle or the fuel cell. Further, the vehicle power source system includes a second voltage translator connected between the relay and the charging portion in the main line and configured to adjust power to be supplied from the sub-battery to the charging portion.

DESCRIPTION OF EMBODIMENTS

With reference to the attached drawings, the following describes embodiments of the present invention.

First Embodiment

Figure 1:
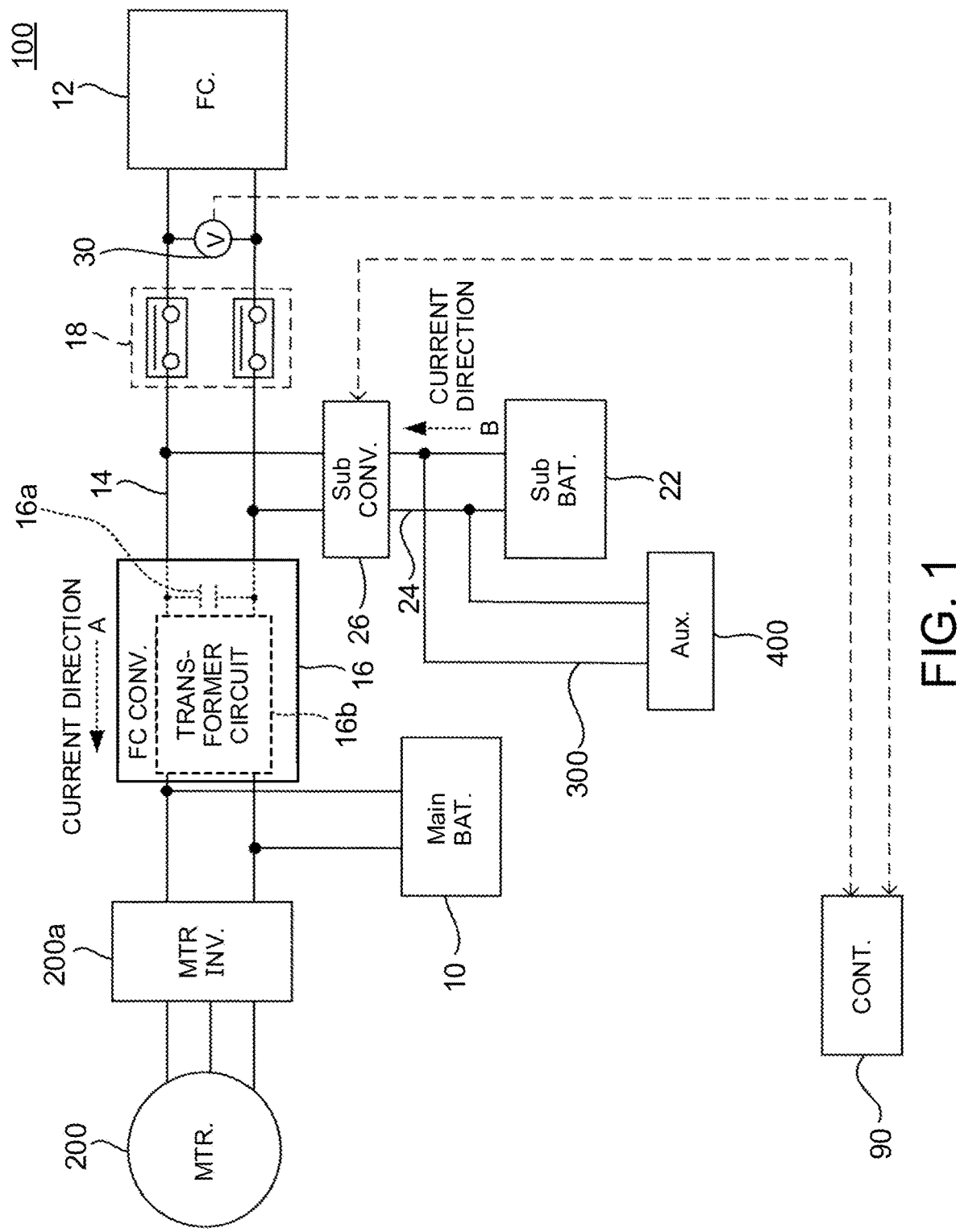
FIG. 1 is a view illustrating a configuration of a vehicle power source system according to a first embodiment.

FIG. 1 is a view to describe a schematic configuration of a vehicle power source system according to the first embodiment.

As illustrated herein, a vehicle power source system 100 includes: a main battery 10 configured to supply power to a drive motor 200 of a vehicle; a solid oxide fuel cell (SOFC) 12 as a fuel cell that supplies power to the main battery 10; a main line 14 that connects the main battery 10 and the SOFC 12; an FC converter 16 as a first voltage translator placed on the main line 14 and configured to transform an output voltage of the SOFC 12; an FC connection relay 18 as a relay provided between the FC converter 16 and the SOFC 12 in the main line 14; and a sub-battery 22 connected to an auxiliary machine power supply line 300 via which power is supplied to an auxiliary machine 400 of the vehicle or the SOFC 12.

The drive motor 200 is constituted by a three-phase alternating current motor and is configured to generate a driving force of the vehicle equipped with the vehicle power source system 100 upon receipt of power supply from the main battery 10 or the SOFC 12. Note that the drive motor 200 functions as a generator depending on a travel state such as a working state of a regenerative brake, for example, and supplies regenerative power to the main battery 10.

Further, the drive motor 200 is provided with a motor inverter 200a configured to convert direct-current power supplied from the main battery 10 and the SOFC 12 into alternating-current power and convert alternating-current regenerative power generated by the drive motor 200 into direct-current power.

The main battery 10 is constituted by a secondary battery such as a lithium-ion battery, for example. Further, while the main battery 10 is charged upon receipt of supply of power from an external charging device (not shown) or generated power of the SOFC 12, the main battery 10 supplies charged power to the drive motor 200 based on a request from the drive motor 200.

The SOFC 12 is formed by laminating cells each obtained by sandwiching an electrolyte layer made of solid oxide such as ceramic between an anode (fuel electrode) and a cathode (air electrode). The SOFC 12 generates power upon receipt of supply of fuel gas (hydrogen) in the fuel electrode and supply of oxidation gas (oxygen) in the air electrode. Note that the SOFC 12 in the present embodiment generates power when charge power of the main battery 10 is insufficient with respect to a travel request, for example, and the SOFC 12 supplies the generated power to the main battery 10 via the FC converter 16 through the main line 14 as a power supply line.

The FC converter 16 is a DC/DC converter configured to transform (boost) a voltage of the generated power of the SOFC 12 and supplies the generate power to the main battery 10 or the drive motor 200. The FC converter 16 includes an input-side capacitor 16a as a charging portion on an FC connection relay 18 side (an SOFC 12 side), and a transformer circuit 16b constituted by a circuit element such as a coil or a transformer for boosting a voltage of power to be supplied from the SOFC 12 to the main battery 10 in a state where the input-side capacitor 16a is charged.

The FC connection relay 18 is constituted by a normally open relay, for example, and opening and closing of the FC connection relay 18 are controlled by a controller 90 in response to a request for the generated power of the SOFC 12 or the like from the main battery 10.

The sub-battery 22 is a battery configured to supply power to the auxiliary machine 400 such as an electrical component of the vehicle or an air blower of the SOFC 12 via the auxiliary machine power supply line 300.

Here, the vehicle power source system 100 of the present embodiment is configured to supply power stored in the sub-battery 22 to the input-side capacitor 16a of the FC converter 16. More specifically, the sub-battery 22 is connected in parallel between the FC connection relay 18 and the FC converter 16 (more specifically, the input-side capacitor 16a) on the main line 14 via a subline 24.

Further, a sub-converter 26 as a second voltage translator configured to control power to be supplied from the sub-battery 22 to the input-side capacitor 16a is further placed on the subline 24. The sub-converter 26 is a DC/DC converter having a function to take out power from the sub-battery 22 and charge the power to the input-side capacitor 16a based on a command from the controller 90.

Further, the vehicle power source system 100 includes the controller 90 configured to control the opening and closing of the FC connection relay 18. The controller 90 is constituted by a computer, particularly a microcomputer including a central processing unit (CPU), a read only memory (ROM), a random access memory (RAM), and an input-output interface (I/O interface). The controller 90 is programed to execute at least any one of processes in the present embodiment and embodiments to be describe below. Note that the controller 90 may be provided as one device or may be divided into a plurality of devices such that respective controls in the present embodiment are processed by the plurality of devices in a dispersed manner.

In the present embodiment, the controller 90 acquires an FC output voltage detection value Vfc_d from an FC voltage sensor 30 as a fuel cell output voltage acquisition portion configured to detect an output voltage of the SOFC 12. Then, the controller 90 executes an opening/closing control on the FC connection relay 18 and a control on the sub-converter 26 based on the FC output voltage detection value Vfc_d.

In the vehicle power source system 100 described above, in a case where the charge power of the main battery 10 is not insufficient and the SOFC 12 is stopped, for example, the FC connection relay 18 is maintained in an opened state.

Meanwhile, in a case where the charge power of the main battery 10 is insufficient and auxiliary power supply from the SOFC 12 is requested, for example, the FC connection relay 18 is closed so that the generated power of the SOFC 12 is supplied to the main battery 10.

At this time, when a difference between the output voltage of the SOFC 12 and the voltage of the input-side capacitor 16a is large, a rush current might occur at the time when a close operation is performed on the relay.

Accordingly, in the present embodiment, the controller 90 controls the sub-converter 26 such that the sub-converter 26 charges the input-side capacitor 16a to a predetermined voltage preferably in a state where the FC connection relay 18 is opened. In the following description, this voltage of the input-side capacitor 16a is also just referred to as "input-side capacitor voltage Vic."

When the input-side capacitor 16a is charged to the predetermined voltage as such, the FC connection relay 18 can be closed in a state where a difference between an open circuit voltage (OCV) of the SOFC 12 and the input-side capacitor voltage Vic is relatively small, for example, at the time of starting the SOFC 12, thereby making it possible to restrain the occurrence of the rush current.

Particularly, in the present embodiment, the input-side capacitor 16a is charged by use of the sub-converter 26. Accordingly, in comparison with a case where the difference between the output voltage of the SOFC 12 and the voltage of the main battery 10 is adjusted by the large FC converter 16 that is assumed to perform a power control on a strong electricity system including the main battery 10, it is possible to restrain a power loss and to eliminate the difference in voltage.

Note that, as a method for charging the input-side capacitor 16a in order to eliminate the difference between the open circuit voltage of the SOFC 12 and the input-side capacitor voltage Vic, it is conceivable that a so-called precharge relay is provided in the FC connection relay 18 and the precharge relay is closed to eliminate a potential difference between the SOFC 12 and the input-side capacitor 16a. However, in this case, power generation preparation of the SOFC 12 is not completed, and the SOFC 12 and the input-side capacitor 16a become conductible via the precharge relay in a state where the output of the SOFC 12 is not stable (IV characteristics of the SOFC 12 are in a transient state).

Accordingly, the charging from the SOFC 12 to the input-side capacitor 16a is performed in a state where the output of the SOFC 12 is not stable, thereby resulting in that the potential difference between the SOFC 12 and the input-side capacitor 16a easily fluctuates, so that a control for eliminating the potential difference fluctuation becomes complicated.

In this respect, in the configuration of the present embodiment, the charging (precharge) to the input-side capacitor 16a by the sub-converter 26 is performable in a state where the conduction between the SOFC 12 and the input-side capacitor 16a is cut off by opening the FC connection relay 18. Accordingly, current application to the input-side capacitor 16a can be stopped until the output of the SOFC 12 becomes stable, thereby making it possible to execute the charging to the input-side capacitor 16a without performing the control for eliminating the potential difference fluctuation. That is, the control for the charging can be simplified.

The vehicle power source system 100 according to the first embodiment as described above yields the following effect.

The vehicle power source system 100 of the present embodiment includes: the main battery 10 configured to supply power to the drive motor 200 of the vehicle; the SOFC 12 as a fuel cell that supplies power at least to the main battery 10; the main line 14 that connects the main battery 10 and the SOFC 12; the FC converter 16 as a first voltage translator including the input-side capacitor 16a as a charging portion placed on the main line 14 and configured to adjust the output voltage of the SOFC 12, and the transformer circuit 16b as a voltage transforming portion; the FC connection relay 18 as a relay provided between the FC converter 16 and the SOFC 12 in the main line 14; and the sub-battery 22 connected to the auxiliary machine power supply line 300 via which power is supplied to the auxiliary machine 400 of the vehicle or the SOFC 12.

Further, the vehicle power source system 100 includes the sub-converter 26 as a second voltage translator connected between the FC connection relay 18 and the input-side capacitor 16a in the main line 14 and configured to adjust power to be supplied from the sub-battery 22 to the input-side capacitor 16a.

Hereby, it is possible to charge the input-side capacitor 16a from the sub-battery 22 by use of the sub-converter 26. Particularly, since a main purpose of the sub-converter 26 is to charge the input-side capacitor 16a, the sub-converter 26 can be formed to be smaller than the large (large-output) FC converter 16 including many elements, wiring lines, and so on and configured complicatedly. Accordingly, in comparison with a case where the difference between the output voltage of the SOFC 12 and the voltage of the main battery 10 is adjusted by the large FC converter 16, it is possible to restrain a power loss and to eliminate the difference between the output voltage of the SOFC 12 and the voltage of the main battery 10.

Particularly, in a case where the difference between the output voltage of the SOFC 12 and the voltage of the main battery 10 is adjusted by use of the FC converter 16, the FC converter 16 is configured as a bidirectional converter, and therefore, the FC converter 16 that is large in the first place is further complicated and upsized due to the bidirectionality. In this regard, in the configuration of the present embodiment, the FC converter 16 can be configured as a unidirectional converter that boosts a voltage in a direction from the SOFC 12 toward the main battery 10, so that the configuration of the FC converter 16 is also simplified. As a result, it is possible to more appropriately simplify the configuration of the whole vehicle power source system 100 and to achieve elimination of the difference between the output voltage of the SOFC 12 and the voltage of the main battery 10.

Further, the vehicle power source system 100 of the present embodiment further includes: the FC voltage sensor 30 as the fuel cell output voltage acquisition portion configured to acquire the output voltage of the SOFC 12; and the controller 90 configured to execute the opening/closing control on the FC connection relay 18 and the control on the sub-converter 26 based on the FC output voltage detection value Vfc_d that is the acquired output voltage of the SOFC 12.

Hereby, the FC connection relay 18 can be closed appropriately in accordance with the FC output voltage detection value Vfc_d at a timing when a rush current caused due to the difference between the open circuit voltage of the SOFC 12 and the voltage of the main battery 10 can be restrained. Accordingly, in a scene such as the start of the SOFC 12, the FC connection relay 18 can be closed at a timing when a difference between the FC output voltage detection value Vfc_d and the input-side capacitor voltage Vic is relatively small, thereby making it possible to restrain the occurrence of the rush current appropriately.

Note that the present embodiment describes an example in which the opening/closing control on the FC connection relay 18 and the control on the sub-converter 26 are executed based on the FC output voltage detection value Vfc_d. However, from the viewpoint of eliminating the difference between the output voltage of the SOFC 12 and the voltage of the main battery 10, the opening/closing control on the FC connection relay 18 and the control on the sub-converter 26 may be executed by use of other given control parameters instead of or together with the FC output voltage detection value Vfc_d, provided that the opening/closing control on the FC connection relay 18 and the control on the sub-converter 26 are executable.

Second Embodiment

The following describes the second embodiment. Note that an element similar to an element in the first embodiment has the same reference sign as used in the first embodiment, and a detailed description thereof is omitted.

Figure 2:
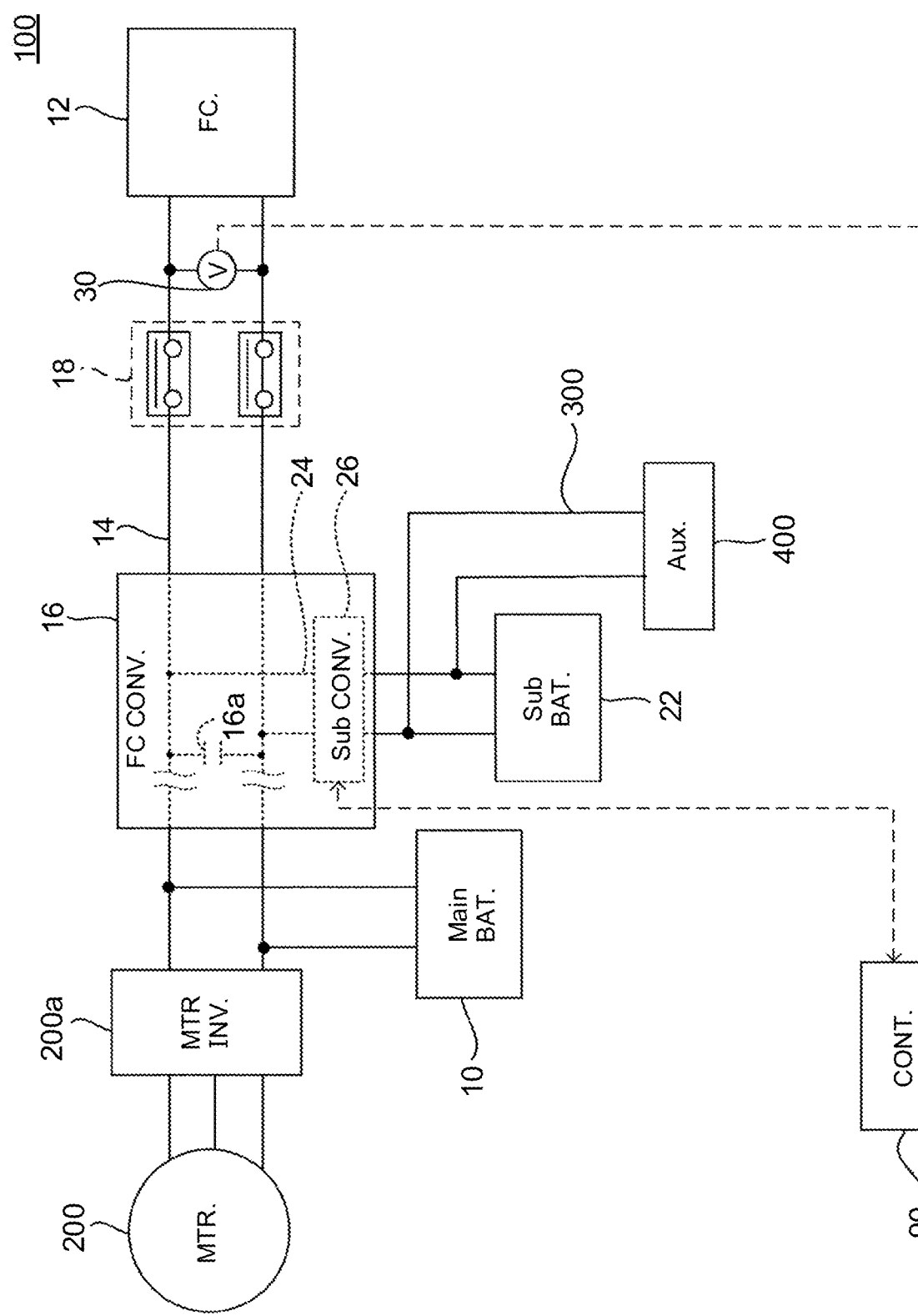
FIG. 2 is a view illustrating a configuration of a vehicle power source system according to a second embodiment.

FIG. 2 is a view illustrating a configuration of the vehicle power source system 100 according to the second embodiment. Note that, for simplification of the drawings, the transformer circuit 16b of the FC converter 16 is omitted.

As illustrated herein, in the present embodiment, the sub-converter 26 is incorporated in the FC converter 16. More specifically, while the sub-converter 26 is connected to the main line 14 between the sub-battery 22 and the input-side capacitor 16a similarly to the first embodiment, the sub-converter 26 is incorporated in the FC converter 16. Hereby, circuit elements and wiring lines used for a control board, a power board, or the like included in the FC converter 16 and the sub-converter 26 can be shared with each other, thereby making it possible to more simplify the system configuration.

Particularly, as has been already described above, the main purpose of the sub-converter 26 is power supply to the auxiliary machine 400 and charging to the input-side capacitor 16a, so that expected control power is smaller than that of the FC converter 16. Accordingly, the sub-converter 26 has a simple circuit configuration and requires a small number of components as compared with the FC converter 16. Accordingly, even if the sub-converter 26 is incorporated in the FC converter 16, it is possible to achieve a charging control on the input-side capacitor 16a as described in the first embodiment without complicating the configuration of the existing FC converter 16.

The vehicle power source system 100 according to the second embodiment as described above yields the following effect.

In the vehicle power source system 100 of the present embodiment, the sub-converter 26 is formed integrally with the FC converter 16. Hereby, circuit elements and wiring lines used for a control board, a power board, or the like included in the FC converter 16 and the sub-converter 26 can be shared with each other, thereby making it possible to more simplify the system configuration. This consequently contributes to downsizing of the vehicle power source system 100.

Third Embodiment

The following describes the third embodiment. Note that an element similar to an element in the first embodiment or the second embodiment has the same reference sign as used in the first embodiment or the second embodiment, and a detailed description thereof is omitted.

Figure 3:
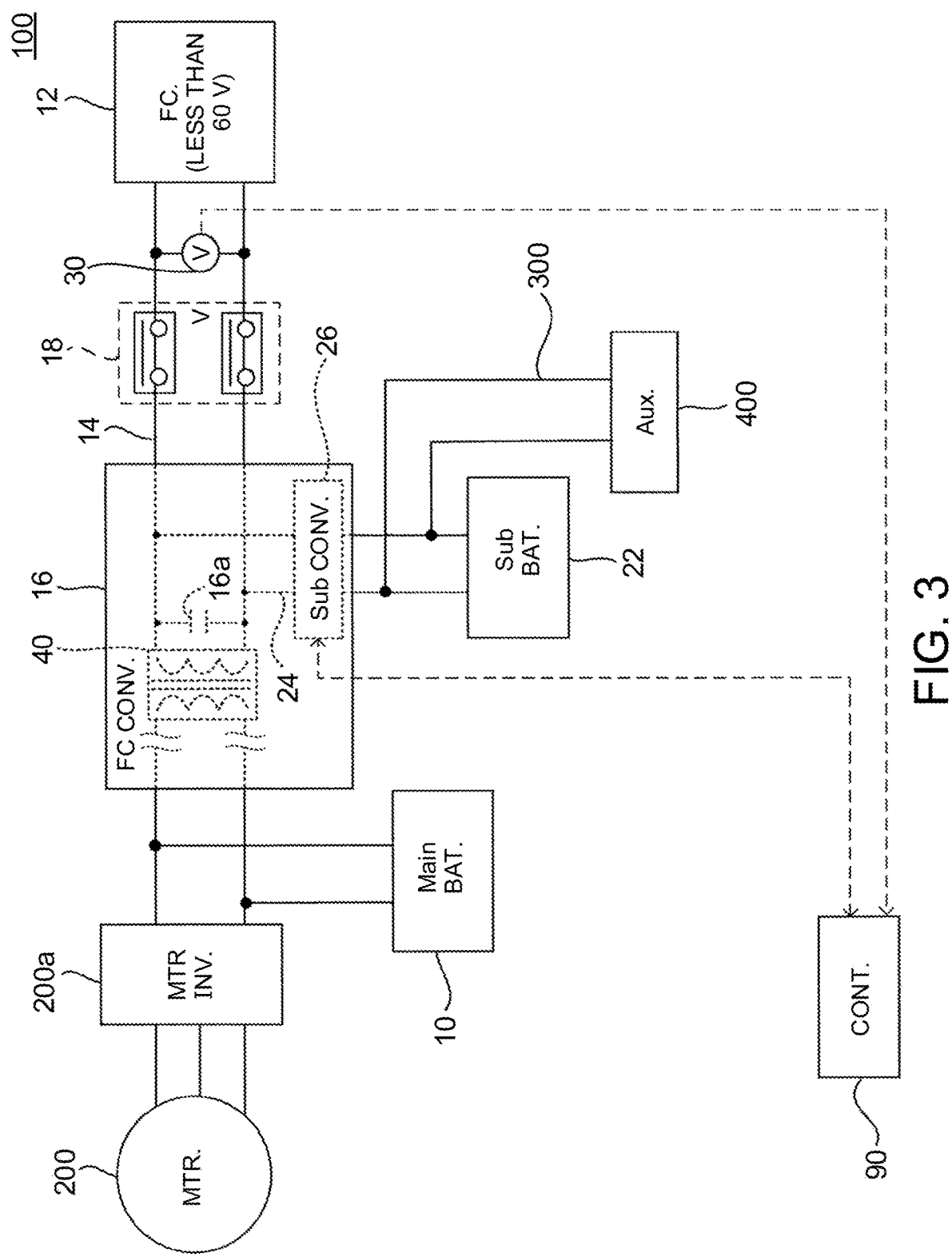
FIG. 3 is a view illustrating a configuration of a vehicle power source system according to a third embodiment.

FIG. 3 is a view illustrating a configuration of the vehicle power source system 100 according to the present embodiment. As illustrated herein, in the present embodiment, the FC converter 16 includes a transformer 40 as the transformer circuit 16b between the SOFC 12 and the main battery 10. Accordingly, the output voltage of the SOFC 12 is boosted by the transformer 40 and supplied to the main battery 10. More particularly, the transformer 40 is placed on a secondary side (a main battery 10 side) relative to the input-side capacitor 16a in the main line 14.

Further, the SOFC 12 of the present embodiment is configured such that its maximum output voltage is less than 60 V. More specifically, the number of laminations of unit cells constituting the SOFC 12 is adjusted so that the maximum output voltage is less than 60 V, for example.

In the present embodiment, when the maximum output voltage of the SOFC 12 is less than 60 V, the SOFC 12 can be removed from subject parts for the high-voltage safety requirements determined from the viewpoint of safety of vehicles.

More specifically, from the viewpoint of safety, it is required that a high-voltage electrical component the voltage of which exceeds 60 V be not placed in a front region or a rear region (hereinafter also just referred to as "collision region") of a vehicle that is assumed to be relatively greatly damaged at the time of a collision. However, since the maximum output voltage of the SOFC 12 of the present embodiment is less than 60 V, the SOFC 12 does not correspond to such a high-voltage electrical component. Accordingly, the SOFC 12 can be placed even in the front region or the rear region of the vehicle where the SOFC 12 should not be placed originally.

Further, in the present embodiment, the transformer 40 of the FC converter 16 is provided between the SOFC 12 that does not correspond to the high-voltage electrical component and the main battery 10 that corresponds to the high-voltage electrical component. Accordingly, the SOFC 12 and the main battery 10 are not wired directly, so that the SOFC 12 is substantially electrically independent from the main battery 10 as the high-voltage electrical component.

That is, since a direct electrical connection between the SOFC 12 and the high-voltage electrical component is cut off, the SOFC 12 can be more surely independent from a high-voltage system including the main battery 10. Hereby, the SOFC 12 can be placed in a given region of the vehicle including the collision region while the high-voltage safety requirements are satisfied, thereby making it possible to improve a degree of freedom of the layout in the vehicle.

The vehicle power source system 100 according to the third embodiment as described above yields the following effect.

In the vehicle power source system 100 of the present embodiment, the voltage transforming portion (the transformer circuit 16b) of the FC converter 16 is constituted by the transformer 40.

Hereby, a direct electrical connection between the SOFC 12 and the main battery 10 as the high-voltage electrical component can be cut off, so that the SOFC 12 can be independent from the high-voltage system.

Further, in the present embodiment, the SOFC 12 is configured such that its maximum output voltage is less than 60 V. Hereby, the SOFC 12 can be removed from subject parts for the high-voltage safety requirements determined from the viewpoint of safety of vehicles.

Accordingly, as described above, when the transformer 40 as the voltage transforming portion is provided between the SOFC 12 and the main battery 10 in the FC converter 16 and the maximum output voltage of the SOFC 12 is set to be less than 60 V, the SOFC 12 is configured as a non-high-voltage electrical component and a direct electrical connection between the SOFC 12 and the main battery 10 as the high-voltage electrical component can be cut off. Accordingly, the SOFC 12 can be placed in a given region of the vehicle including the collision region while the high-voltage safety requirements are satisfied, thereby making it possible to improve a degree of freedom of the layout in the vehicle. Particularly, by placing the SOFC 12 in a region such as a vehicle front part or a vehicle rear part where the number of arrangements of other components including other high-voltage electrical components is small, the SOFC 12 having a high operating temperature can be separated from the other components as far as possible.

Note that the present embodiment describes an example in which the transformer 40 is provided in the FC converter 16 configured such that the sub-converter 26 is incorporated therein. However, in the configuration where the FC converter 16 is separated from the sub-converter 26 as described in FIG. 1 in the first embodiment, the transformer 40 may be provided in the FC converter 16.

Fourth Embodiment

The following describes the fourth embodiment. Note that an element similar to an element in the first to third embodiments has the same reference sign as used in the first to third embodiments, and a detailed description thereof is omitted. The present embodiment describes one aspect of a closing control (hereinafter also referred to as "start-time relay closing control") on the FC connection relay 18 that is executed in a scene where the SOFC 12 is started in the vehicle power source system 100 having the configuration described in the first to third embodiments.

Figure 4:
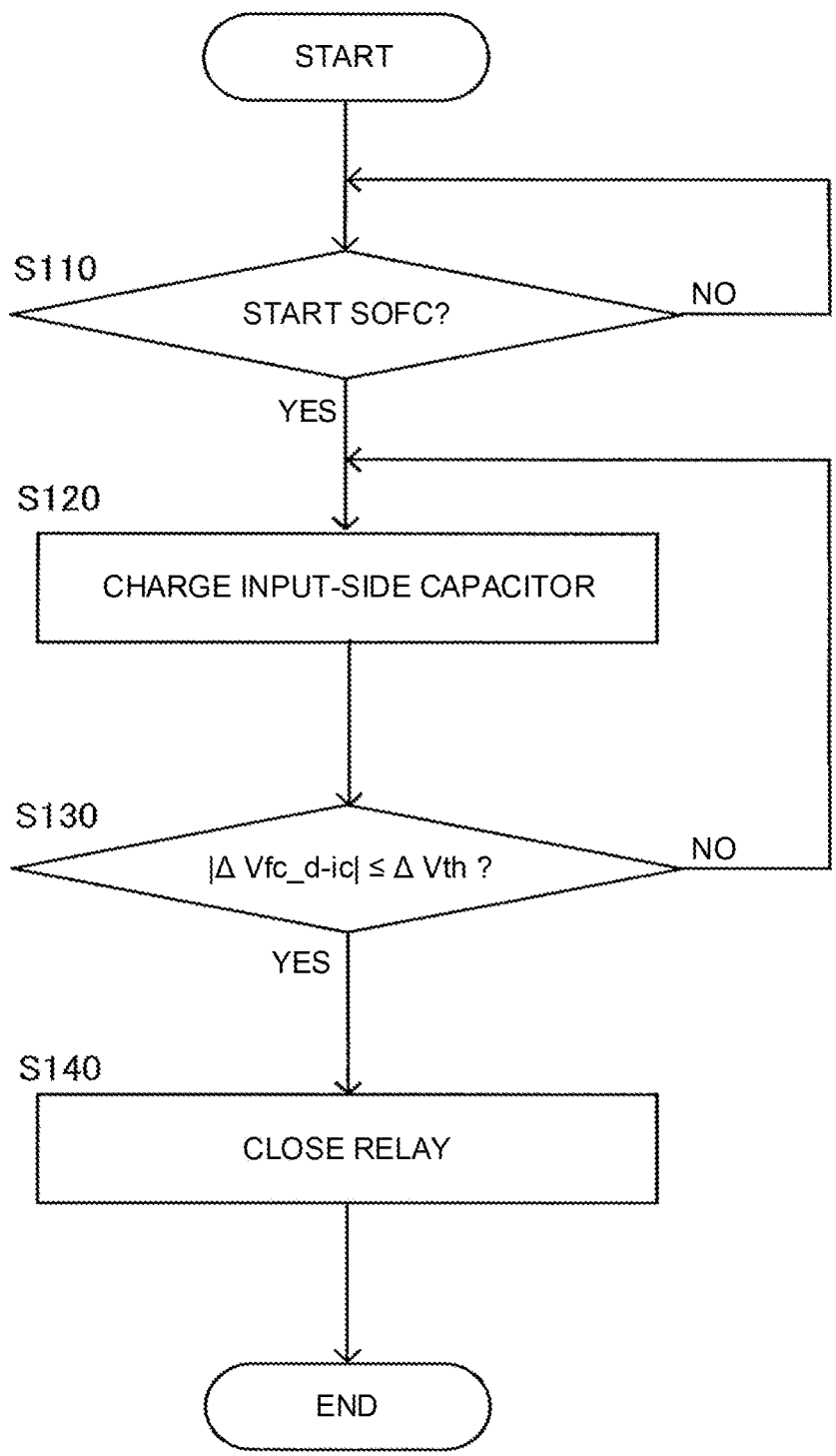
FIG. 4 is a flowchart to describe a procedure of a start-time relay closing control according to a fourth embodiment.

FIG. 4 is a flowchart to describe a procedure of the start-time relay closing control according to the present embodiment.

As illustrated herein, in step S110, the controller 90 determines whether the SOFC 12 starts or not. More specifically, at the time when a power generation request to the SOFC 12 is detected in a case where, for example, a remaining charge amount (SOC) of the main battery 10 becomes lower than a predetermined value, the controller 90 determines that the SOFC 12 starts. When it is determined that the SOFC 12 starts, the controller 90 performs a process of step S120.

In step S120, the controller 90 charges the input-side capacitor 16a of the FC converter 16 in the opened state of the FC connection relay 18. More specifically, the controller 90 controls the sub-converter 26 such that the input-side capacitor 16a is charged so that the input-side capacitor voltage Vic approaches the FC output voltage detection value Vfc_d. That is, by bringing the input-side capacitor voltage Vic close to the open circuit voltage of the SOFC 12, a voltage difference between the input-side capacitor voltage Vic and the open circuit voltage of the SOFC 12 is restrained.

In step S130, the controller 90 determines whether or not an absolute value (hereinafter also referred to as "FC-capacitor voltage difference absolute value $|\Delta Vfc\_d\text{-}ic|$") of the difference between the FC output voltage detection value Vfc_d and the input-side capacitor voltage Vic is a predetermined threshold voltage difference $\Delta Vth$ or less. When it is determined that the FC-capacitor voltage difference absolute value $|\Delta Vfc\_d\text{-}ic$ is the threshold voltage difference $\Delta Vth$ or less, the controller 90 performs a process of step S140.

Then, in step S140, the controller 90 closes the FC connection relay 18.

By the processes from step S120 to step S140 as described above, the FC connection relay 18 is closed in a state where the voltage difference between the input-side capacitor voltage Vic and the open circuit voltage of the SOFC 12 is made relatively small. This accordingly makes it possible to restrain the occurrence of the rush current at the time when the FC connection relay 18 is closed.

The vehicle power source system 100 according to the fourth embodiment as described above yields the following effect.

In the vehicle power source system 100 of the present embodiment, the controller 90 determines whether the SOFC 12 starts or not (step S110 in FIG. 4), and when it is determined that the SOFC 12 starts, the controller 90 controls the sub-converter 26 such that the input-side capacitor 16a is charged from the sub-battery 22 (S120 in FIG. 4). Then, the controller 90 closes the FC connection relay 18 after the input-side capacitor 16a is charged (step S140 in FIG. 4).

With this configuration, at the time of starting the SOFC 12, charging is performed to the input-side capacitor 16a in a state where the FC connection relay 18 is opened, so that the input-side capacitor voltage Vic can be brought close to the open circuit voltage of the SOFC 12. Accordingly, the voltage difference between the input-side capacitor voltage Vic and the open circuit voltage of the SOFC 12 can be reduced, and the FC connection relay 18 can be closed in a state where the voltage difference is reduced, thereby making it possible to more surely restrain the occurrence of the rush current at the time when the FC connection relay 18 is closed.

Particularly, in the vehicle power source system 100 of the present embodiment, the controller 90 performs charging to the input-side capacitor 16a so that the FC-capacitor voltage difference absolute value $|\Delta Vfc\_d\text{-}ic|$ as the difference between the input-side capacitor voltage Vic as the voltage of the input-side capacitor 16a and the FC output voltage detection value Vfc_d becomes the threshold voltage difference $\Delta Vth$ or less (step S120 and step S130 in FIG. 4).

Hereby, it is possible to more surely reduce the voltage difference between the input-side capacitor voltage Vic and the open circuit voltage of the SOFC 12.

Note that the present embodiment describes an example in which the controller 90 performs charging to the input-side capacitor 16a by detecting the power generation request to the SOFC 12 when the controller 90 determines that the SOFC 12 starts. However, for example, the SOC of the main battery 10 may be monitored to detect such a prediction that the start of the SOFC 12 is required, and when the prediction is detected, the input-side capacitor 16a may be charged before a start process of the SOFC 12 is actually performed (before the detection of the power generation request).

Next will be described a modification of the present embodiment. The present modification describes other aspects of the charging control to the input-side capacitor 16a in step S120 and step S130.

Figure 5:
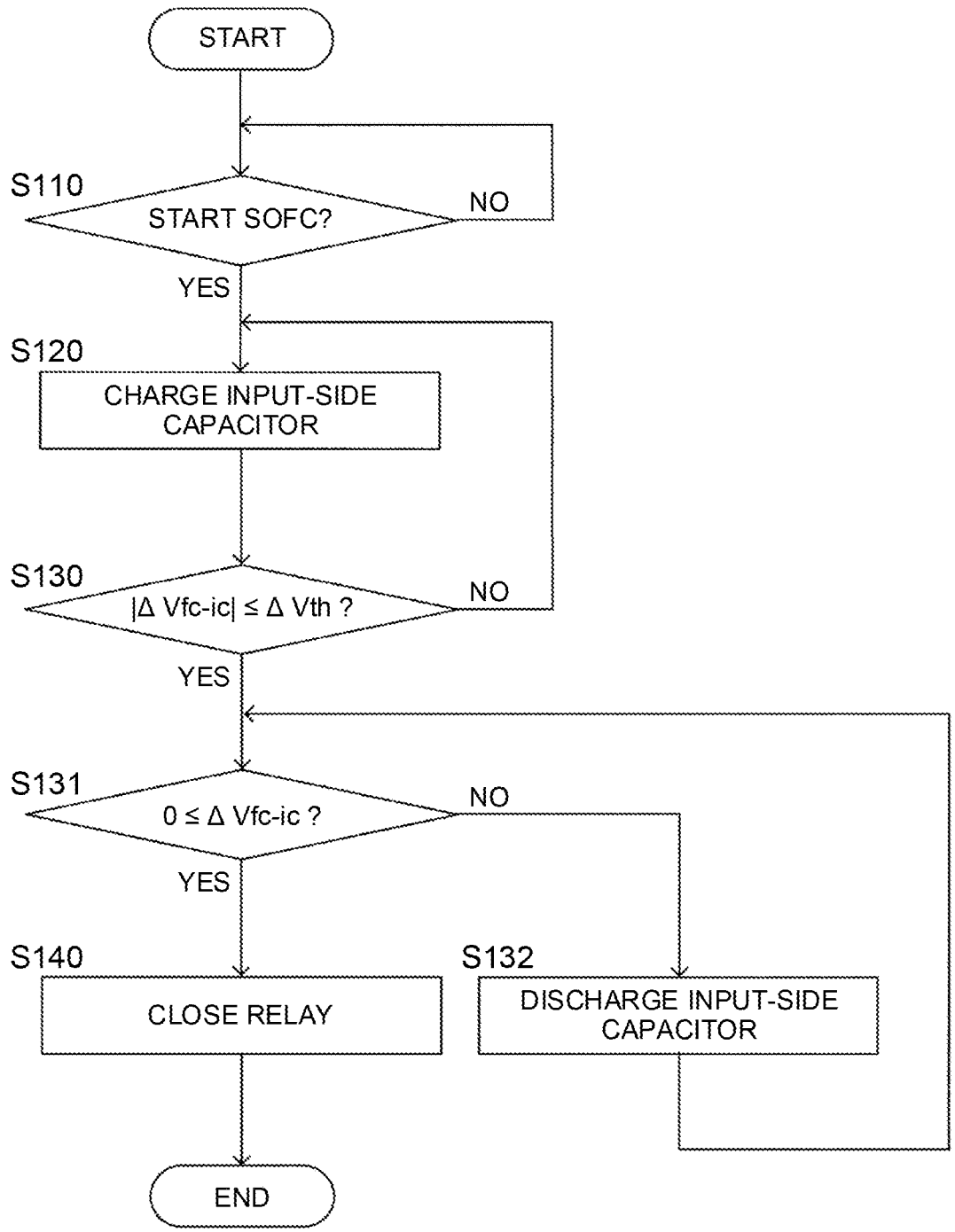
FIG. 5 is a flowchart to describe a procedure of a start-time relay closing control in a modification of the fourth embodiment.

FIG. 5 is a flowchart to describe a procedure of the start-time relay closing control in the present modification. Note that, in FIG. 5, a process similar to a process described in FIG. 4 has the same step number as the process in FIG. 4.

In the present modification, when it is determined, in step S130, that the FC-capacitor voltage difference absolute value $|\Delta Vfc\_d\text{-}ic|$ is the threshold voltage difference $\Delta Vth$ or less after the processes of step S110 and step S120 similarly to FIG. 4 are performed, the controller 90 performs a determination process of step S131.

In step S131, the controller 90 determines whether or not an FC-capacitor voltage difference $\Delta Vfc\_d\text{-}ic$ obtained by subtracting the input-side capacitor voltage Vic from the FC output voltage detection value Vfc_d is zero or more. That is, it is determined whether the FC output voltage detection value Vfc_d is the input-side capacitor voltage Vic or more.

Then, when it is determined that the FC output voltage detection value Vfc_d is the input-side capacitor voltage Vic or more, the controller 90 closes the FC connection relay 18 in step S140.

In the meantime, when it is determined, in step S131, that the FC output voltage detection value Vfc_d is less than the input-side capacitor voltage Vic, the controller 90 discharges power charged in the input-side capacitor 16a in step S132. More specifically, the controller 90 controls the sub-converter 26 such that charge power is discharged from the input-side capacitor 16a to a discharge circuit (not shown) provided inside the sub-converter 26 or provided separately from the sub-converter 26.

In the present modification, the FC connection relay 18 can be closed in a state where the output voltage of the SOFC 12 is higher than the input-side capacitor voltage Vic, so that a current flowing at the time when the FC connection relay 18 is closed can be directed toward the input-side capacitor 16a from the SOFC 12. This accordingly makes it possible to restrain the current from flowing from the input-side capacitor 16a into the SOFC 12 at the time when the FC connection relay 18 is closed.

Note that, at the time of starting the charging described in step S120, it is considered that the voltage of the input-side capacitor 16a is lower than the output voltage of the SOFC 12. Accordingly, under a charging control to cause the FC-capacitor voltage difference absolute value $|\Delta Vfc\_d\text{-}ic|$ to be not more than the threshold voltage difference $\Delta Vth$ as described in step S120 and step S130, the sub-converter 26 basically enters a state where the sub-converter 26 supplies power to the input-side capacitor 16a (power is not supplied from the input-side capacitor 16a to the sub-converter 26). That is, it is considered that the input-side capacitor voltage Vic is basically lower than the FC output voltage detection value Vfc_d during the charging control. However, it is also considered that the start-time relay closing control is started in a state where the input-side capacitor 16*a* has been already charged to some extent in a scene such as a restart time after a short stop of the SOFC 12.

Further, such a situation might occur that the input-side capacitor voltage Vic exceeds the FC output voltage detection value Vfc_d due to overshooting, hunting, or the like, for example. Particularly, in a range of the FC-capacitor voltage difference absolute value |ΔVfc_d-ic|≤the threshold voltage difference ΔVth, it is assumed that a control value is statically determined in a state where the input-side capacitor voltage Vic exceeds the FC output voltage detection value Vfc_d.

In this respect, in the configuration of the present modification, when the input-side capacitor voltage Vic exceeds the FC output voltage detection value Vfc_d, a control of discharging the input-side capacitor 16*a*, that is, a control of causing the input-side capacitor voltage Vic to be not more than the output voltage of the SOFC 12 is performed, thereby making it possible to more surely restrain the FC connection relay 18 from being closed in a state where the input-side capacitor voltage Vic exceeds the FC output voltage detection value Vfc_d. As a result, it is possible to more surely prevent a current from flowing into the SOFC 12 at the time when the FC connection relay 18 is closed.

The vehicle power source system 100 according to the modification of the fourth embodiment as described above yields the following effect.

In the vehicle power source system 100 of the present modification, the controller 90 controls the sub-converter 26 such that the input-side capacitor 16*a* is charged so that the input-side capacitor voltage Vic becomes the FC output voltage detection value Vfc_d or less (step S131 and step S132 in FIG. 5).

This makes it possible to more surely restrain the FC connection relay 18 from being closed in a state where the input-side capacitor voltage Vic exceeds the FC output voltage detection value Vfc_d, thereby making it possible to more surely prevent a current from flowing into the SOFC 12 at the time when the FC connection relay 18 is closed. As a result, it is possible to more surely prevent an adverse effect to component parts of the SOFC 12 that is caused when the current flows into the SOFC 12.

Note that the present modification describes a control of discharging the input-side capacitor 16*a* as one example of the control of causing the input-side capacitor voltage Vic to be not more than the output voltage of the SOFC 12. However, other controls of causing the input-side capacitor voltage Vic to be not more than the output voltage of the SOFC 12 may be employed. For example, a target value of the input-side capacitor voltage Vic may be set to be lower than the FC output voltage detection value Vfc_d by a predetermined margin in a range where the FC-capacitor voltage difference absolute value |ΔVfc_d-ic| is the threshold voltage difference ΔVth or less, so that the input-side capacitor voltage Vic is maintained to be not more than the output voltage of the SOFC 12.

Fifth Embodiment

The following describes the fifth embodiment. Note that an element similar to an element in the first to fourth embodiments has the same reference sign as used in the first to fourth embodiments, and a detailed description thereof is omitted. Particularly, the present embodiment describes an aspect different from the fourth embodiment in terms of the start-time relay closing control.

Further, the present embodiment is described based on the start-time relay closing control of the fourth embodiment as illustrated in FIG. 4 from the viewpoint of simplification of the description, and any of the fifth embodiment to the ninth embodiment may be also based on the start-time relay closing control according to the modification of the fourth embodiment as illustrated in FIG. 5.

Figure 6:
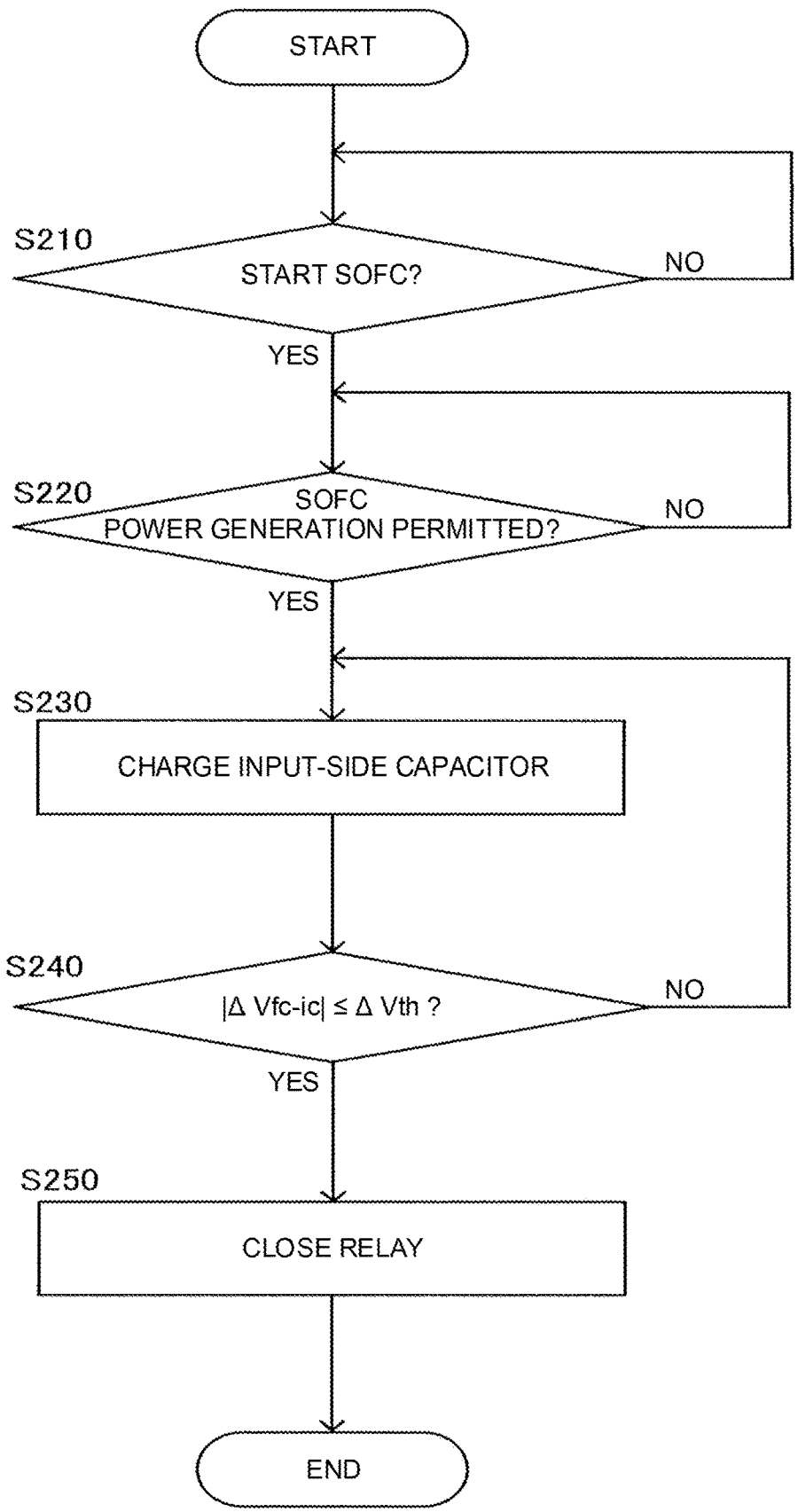
FIG. 6 is a flowchart to describe a procedure of a start-time relay closing control according to a fifth embodiment.

FIG. 6 is a flowchart to describe a procedure of the start-time relay closing control according to the present embodiment.

As illustrated herein, in step S210, the controller 90 determines whether the SOFC 12 starts or not, similarly to the fourth embodiment. When it is determined that the SOFC 12 starts, the controller 90 performs a process of step S220.

In step S220, the controller 90 performs a power generation permission determination of determining whether power generation of the SOFC 12 is permitted or not. More specifically, in the start process of the SOFC 12, a warming-up process of heating the SOFC 12 by a start combustor or the like (not shown) is performed, so that the temperature of the SOFC 12 gradually rises and approaches a predetermined operating temperature (e.g., 700° C. to 900° C.). When the SOFC 12 reaches such an appropriate operating temperature, the SOFC 12 operates with requested power generation characteristics.

Accordingly, in the present embodiment, when the warming-up process is completed, it is determined that the power generation of the SOFC 12 is permitted. In the meantime, when the warming-up process of the SOFC 12 is not completed and the SOFC 12 does not reach the appropriate operating temperature, the SOFC 12 may not reach the requested power generation characteristics, so that it is determined that the power generation of the SOFC 12 is not permitted.

Note that, in a case where the FC connection relay 18 is opened and the current is not taken out from the SOFC 12 substantially, the power generation characteristics of the SOFC 12 correlate with the magnitude of the open circuit voltage of the SOFC 12. That is, the power generation characteristics of the SOFC 12 are higher as the open circuit voltage of the SOFC 12 is larger. Accordingly, in the present embodiment, in a state where the FC connection relay 18 is opened, a determination on power generation permission of the SOFC 12 is performed based on the FC output voltage detection value Vfc_d as the open circuit voltage of the SOFC 12. The following describes a specific content of the power generation permission determination.

Figure 7:
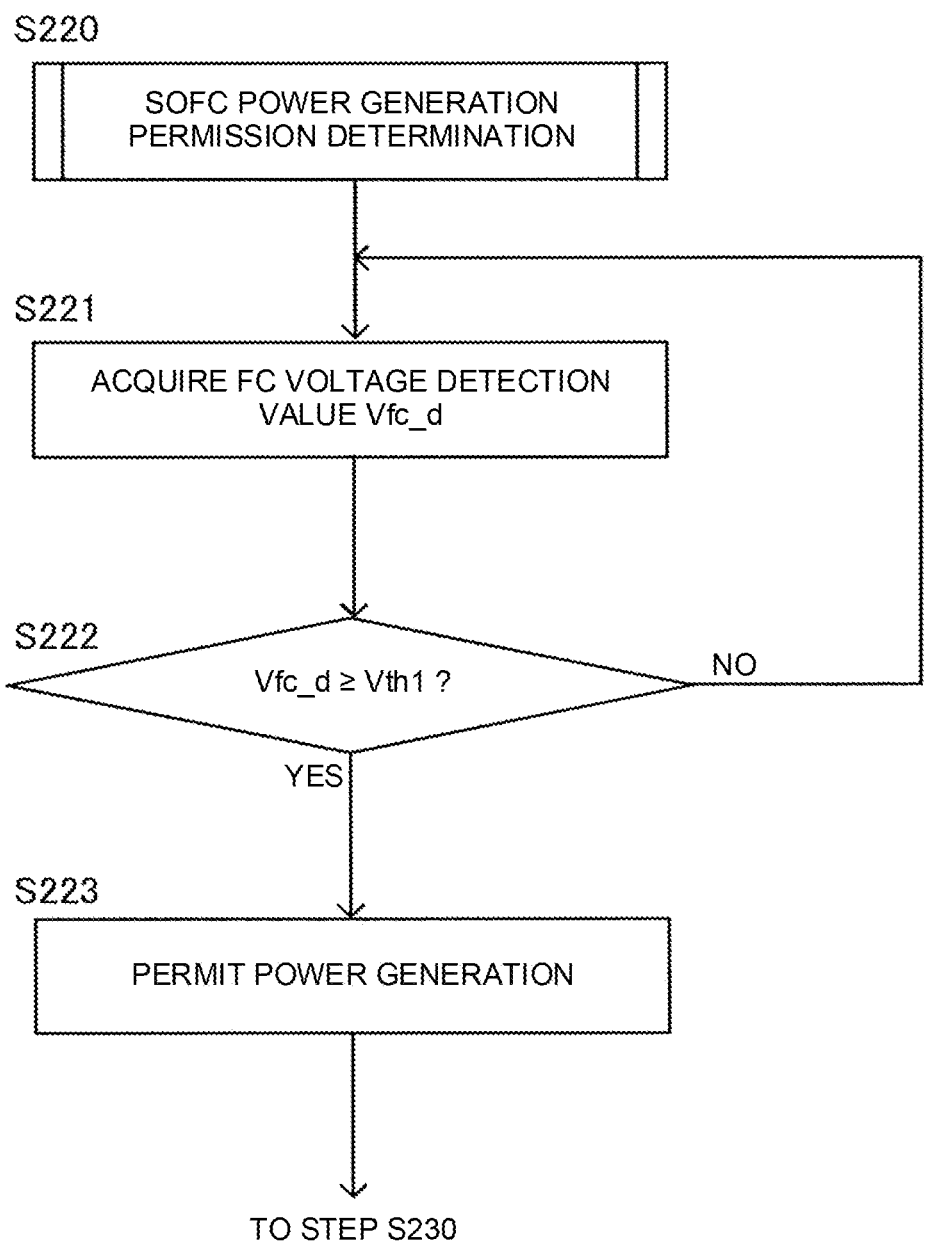
FIG. 7 is a flowchart to describe a procedure of a power generation permission determination according to the fifth embodiment.

FIG. 7 is a flowchart illustrating a process of determining whether power generation of the SOFC 12 is permitted or not, in the present embodiment.

As illustrated herein, in step S221, the controller 90 acquires the FC output voltage detection value Vfc_d from the FC voltage sensor 30.

Then, in step S222, the controller 90 determines whether the FC output voltage detection value Vfc_d reaches a threshold voltage Vth1 or not, that is, whether Vfc_d≥Vth1 is satisfied or not. Here, the threshold voltage Vth1 is set appropriately as a reference for the FC output voltage detection value Vfc_d based on which it is determined that the power generation characteristics of the SOFC 12 that are generally requested can be achieved (it is determined that the warming-up process is finished).

When it is determined that the FC output voltage detection value Vfc_d is the threshold voltage Vth1 or more, the controller 90 determines that the power generation of the SOFC 12 is permitted and proceeds to step S230.

Referring back to FIG. 6, the controller 90 performs processes of step S230, step S240, and step S250 similarly to the processes of step S120, step S130, and step S140 in FIG. 5 according to the fourth embodiment, and then, the controller 90 closes the FC connection relay 18.

Accordingly, with the present embodiment, the FC connection relay 18 can be closed in a state where the power generation of the SOFC 12 is permitted and its power generation characteristics are stable. That is, the FC connection relay 18 can be closed in a region where a change in the output voltage with respect to the current taken out from the SOFC 12 is relatively small.

Hereby, in a case where the FC connection relay 18 is closed in a state where the output voltage of the SOFC 12 is the input-side capacitor voltage Vic or more, for example, it is possible to restrain such a state (voltage hunting) that the output voltage of the SOFC 12 largely decreases due to the current flowing from the SOFC 12 to the input-side capacitor 16a, and the input-side capacitor voltage Vic accordingly further exceeds the output voltage of the SOFC 12, so that the current flows in a reverse direction.

The vehicle power source system 100 according to the fifth embodiment as described above yields the following effect.

In the vehicle power source system 100 of the present embodiment, the controller 90 determines whether power generation of the SOFC 12 is permitted or not at the time of starting the SOFC 12 (step S220 in FIG. 6), and when it is determined that the power generation of the SOFC 12 is permitted, the controller 90 controls the sub-converter 26 such that the input-side capacitor 16a is charged (step S230 in FIG. 6), and after the input-side capacitor 16a is charged, the controller 90 closes the FC connection relay 18 (step S250 in FIG. 6). Particularly, the controller 90 performs the determination on whether the power generation of the SOFC 12 is permitted or not based on whether the FC output voltage detection value Vfc_d is the threshold voltage Vth1 or more (step S222 in FIG. 7), and when the FC output voltage detection value Vfc_d is the threshold voltage Vth1 or more, the controller 90 determines that the power generation of the SOFC 12 is permitted (step S223 in FIG. 7).

Hereby, it is possible to more surely detect a state where the power generation of the SOFC 12 is permitted and its power generation characteristics are stable and to close the FC connection relay 18 at the timing when the power generation characteristics are stable. That is, the FC connection relay 18 can be closed in a region where the change in the output voltage with respect to the current taken out from the SOFC 12 is relatively small. Hereby, at the time when the current is taken out from the SOFC 12 to be supplied to the main battery 10 or the like after the FC connection relay 18 is closed, it is possible to restrain the voltage hunting caused due to fluctuations in the output voltage of the SOFC 12.

Note that, in the power generation permission determination based on the FC output voltage detection value Vfc_d in the present embodiment, the FC output voltage detection value Vfc_d does not reach the threshold voltage Vth1 even in a state where, although the temperature of the SOFC 12 reaches the appropriate operating temperature, the power generation of the SOFC 12 is not stable due to various other factors, e.g., an inappropriate supply balance (stoichiometric ratio) between the fuel and the air in the SOFC 12. In this case, the power generation is also not permitted.

That is, even in a case where the power generation is not stable due to other factors except the state where the temperature of the SOFC 12 does not reach the operating temperature, the FC connection relay 18 is not closed. Accordingly, the FC connection relay 18 can be prevented from being closed by more surely detecting a case where the power generation of the SOFC 12 is not stabilized due to those other factors and there is a concern about the above voltage hunting. This accordingly makes it possible to more surely restrain the occurrence of the rush current at the time when the FC connection relay 18 is closed.

Note that, in the above embodiment, the controller 90 determines whether the power generation of the SOFC 12 is permitted or not, based on the FC output voltage detection value Vfc_d. However, for example, the controller 90 may give a relatively small predetermined load to the SOFC 12 and estimate the power generation characteristics of the SOFC 12 based on a change in the output current of the SOFC 12 due to the load and a change in the FC output voltage detection value Vfc_d before and after the load is given, and when the estimated power generation characteristics reach a predetermined power generation characteristic threshold, the controller 90 may determine that the power generation is permitted.

Sixth Embodiment

The following describes the sixth embodiment. Note that an element similar to an element in the first to fifth embodiments has the same reference sign as used in the first to fifth embodiments, and a detailed description thereof is omitted. In the present embodiment, the power generation permission determination of the SOFC 12 in the closing control on the FC connection relay 18 is performed based on the temperature (stack temperature Ts) of the SOFC 12 instead of the FC output voltage detection value Vfc_d in the fifth embodiment.

Figure 8:
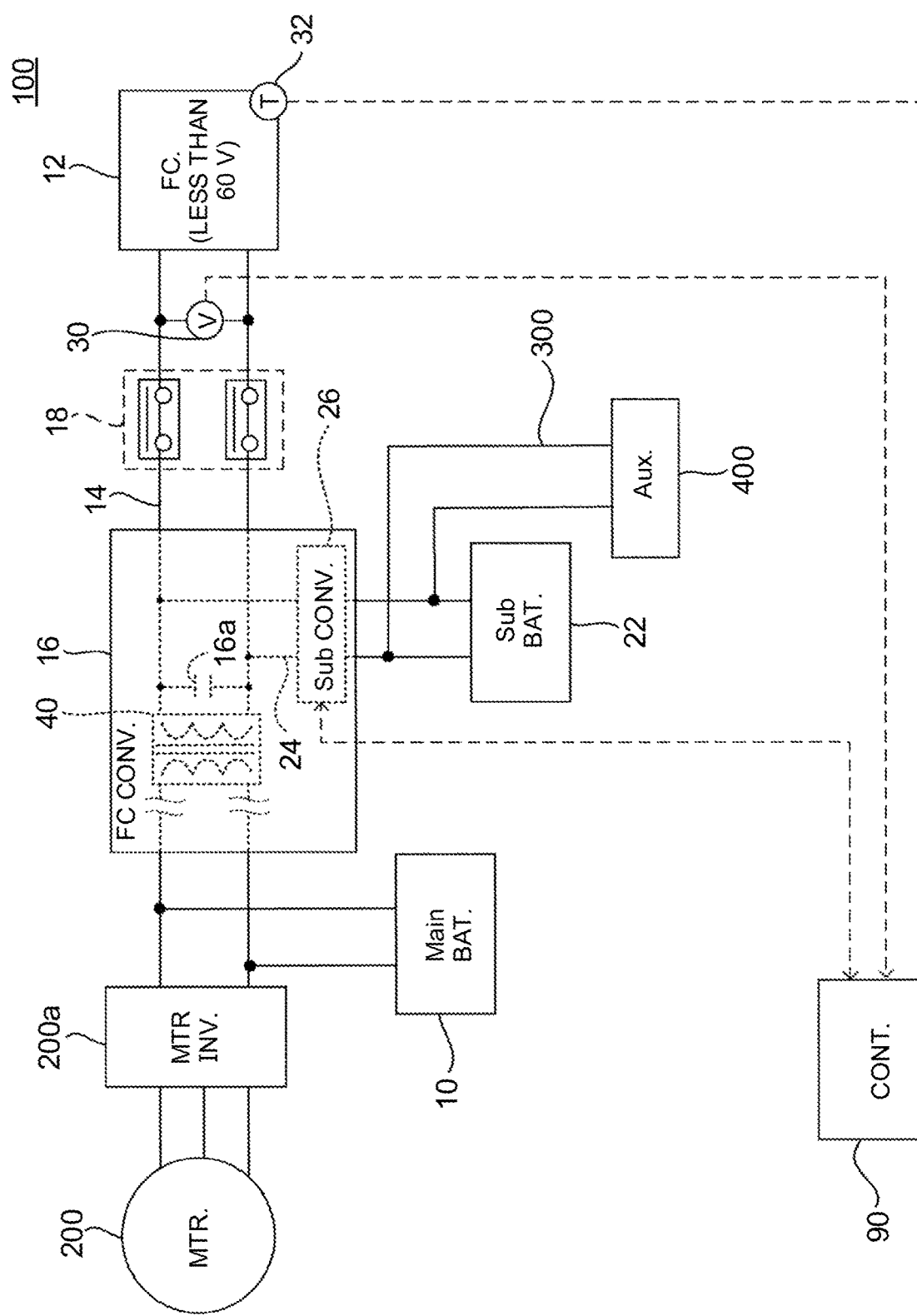
FIG. 8 is a view illustrating a configuration of a vehicle power source system according to a sixth embodiment.

FIG. 8 is a view illustrating a configuration of the vehicle power source system 100 according to the present embodiment. As illustrated herein, while the vehicle power source system 100 is based on the system configuration (see FIG. 3) described in the third embodiment, the SOFC 12 is provided with a stack temperature sensor 32 configured to detect the temperature of the SOFC 12. A stack temperature detection value Ts_d detected by the stack temperature sensor 32 is transmitted to the controller 90 appropriately.

Note that the procedure of the start-time relay closing control according to the present embodiment is similar to the procedure illustrated in FIG. 6 according to the fifth embodiment, and therefore, only a part of the power generation permission determination that is different from the fifth embodiment will be described.

Figure 9:
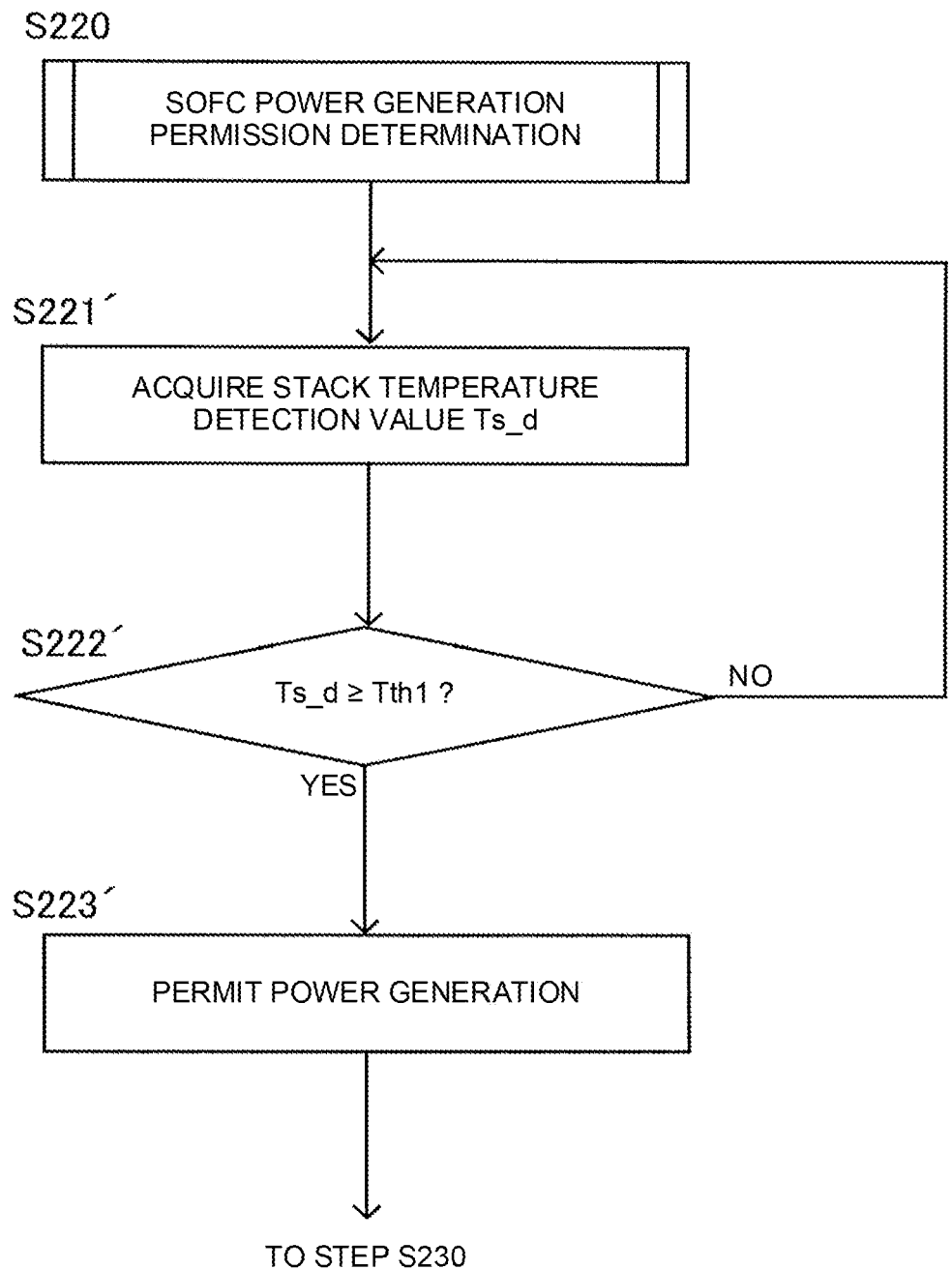
FIG. 9 is a flowchart to describe a procedure of a power generation permission determination according to the sixth embodiment.

FIG. 9 is a flowchart illustrating a process of determining whether power generation of the SOFC 12 is permitted or not, in the present embodiment.

As illustrated herein, in step S221', the controller 90 acquires the stack temperature detection value Ts_d from the stack temperature sensor 32.

In step S222', the controller 90 determines whether the stack temperature detection value Ts_d reaches a first threshold temperature Tth1 or not, that is, whether Ts_d≥Tth1 is satisfied or not. Here, the first threshold temperature Tth1 is determined from the viewpoint of whether or not the stack temperature detection value Ts_d is a temperature at which generally requested power generation characteristics of the SOFC 12 can be obtained.

When it is determined that the stack temperature detection value Ts_d is the first threshold temperature Tth 1 or more, the controller 90 determines in step S223' that the power generation of the SOFC 12 is permitted. After the controller 90 performs the processes of step S230, step S240, and step S250 in FIG. 6 according to the fifth embodiment, the controller 90 closes the FC connection relay 18.

Accordingly, with the present embodiment, it is possible to close the FC connection relay 18 by more surely detecting that the stack temperature Ts reaches a predetermined operating temperature. Note that, at the time of starting the SOFC 12, an increase in the stack temperature Ts along with the progress of the warming-up process generally correlates to the improvement in the power generation characteristics of the SOFC 12. Accordingly, the FC connection relay 18 can be closed such that the controller 90 appropriately detects a time when the power generation characteristics of the SOFC 12 achieve the requested characteristics by determining, based on the stack temperature detection value Ts_d, whether the power generation of the SOFC 12 is permitted or not.

The vehicle power source system 100 according to the sixth embodiment as described above yields the following effect.

The vehicle power source system 100 of the present embodiment further includes the stack temperature sensor 32 as a fuel cell temperature acquisition portion configured to acquire the stack temperature detection value Ts_d as the temperature of the SOFC 12. Then, the controller 90 performs the determination on whether the power generation of the SOFC 12 is permitted or not based on whether the stack temperature detection value Ts_d is the first threshold temperature Tth 1 or more (step S222' in FIG. 9), and when the stack temperature detection value Ts_d is the first threshold temperature Tth 1 or more, the controller 90 determines that the power generation of the SOFC 12 is permitted (step S223' in FIG. 9).

Hereby, it is possible to close the FC connection relay 18 by more surely detecting an increase in the power generation characteristics of the SOFC 12 along with the progress of the warming-up process. That is, the FC connection relay 18 can be closed more surely at a timing when a change in the output voltage with respect to the current taken out from the SOFC 12 is relatively small. Hereby, at the time when the current is taken out from the SOFC 12 to be supplied to the main battery 10 or the like after the FC connection relay 18 is closed, it is possible to more appropriately restrain the voltage hunting caused due to fluctuations in the output voltage of the SOFC 12.

Particularly, in a start scene of the SOFC 12 where the power generation permission determination of the present embodiment is performed, the stack temperature Ts can be virtually considered as a parameter indicative of the power generation characteristics of the SOFC 12. Accordingly, when the stack temperature detection value Ts_d is taken as a parameter, it is possible to grasp the power generation characteristics of the SOFC 12 with high accuracy and to close the FC connection relay 18 at an appropriate timing. This accordingly makes it possible to more surely restrain the occurrence of the rush current at the time when the FC connection relay 18 is closed.

Note that the present embodiment describes an example in which, while the vehicle power source system 100 is based on the system configuration (see FIG. 3) described in the third embodiment, the SOFC 12 is provided with the stack temperature sensor 32 configured to detect the temperature of the SOFC 12, and the closing control on the FC connection relay 18 and the power generation permission determination in the closing control are performed. However, the present embodiment is not limited to this. While the vehicle power source system 100 is based on the system configuration (see FIG. 1) described in the first embodiment and the system configuration (see FIG. 2) described in the second embodiment, the SOFC 12 may be provided with the stack temperature sensor 32 configured to detect the temperature of the SOFC 12, and the closing control on the FC connection relay 18 and the power generation permission determination in the closing control may be performed.

Further, the power generation permission determination may be performed by use of the output voltage (the FC output voltage detection value Vfc_d) of the SOFC 12 in addition to the stack temperature Ts (the stack temperature detection value Ts_d). For example, when both the stack temperature detection value Ts_d and the FC output voltage detection value Vfc_d respectively reach the first threshold temperature Tth1 and the threshold voltage Vth1 or more, it may be determined that the power generation of the SOFC 12 is permitted.

That is, as has been already described above, in the start scene of the SOFC 12, generally, the stack temperature Ts can be a parameter indicative of the power generation characteristics of the SOFC 12. However, for example, such a case is assumed that, although the stack temperature detection value Ts_d is the first threshold temperature Tth1 or more, desired power generation characteristics cannot be obtained for such a reason that the warming-up process itself is performed normally, but the stoichiometric ratio between the fuel and the air supplied to the SOFC 12 is not appropriate. In this case, since the power generation characteristics are low in practice, and the SOFC 12 is not prepared sufficiently, it is preferable to determine that the power generation is not permitted.

In this respect, in a case where the power generation permission determination of the SOFC 12 is performed based on both the stack temperature detection value Ts_d and the FC output voltage detection value Vfc_d as described above, even when the stack temperature detection value Ts_d is the first threshold temperature Tth 1 or more, the FC output voltage detection value Vfc_d does not become the threshold voltage Vth1 or more, and therefore, it is possible to determine that the power generation is not permitted by more surely detecting a state where the above desired power generation characteristics are not obtained.

In the meantime, such a case is assumed that the open circuit voltage of the SOFC 12 rises to be higher than expected due to individual differences between the unit cells constituting the SOFC 12 or the like, for example, and the FC output voltage detection value Vfc_d becomes the threshold voltage Vth1 or more although the SOFC 12 does not reach the desired power generation characteristics. In this case, since the warming-up process is not completed actually, the stack temperature detection value Ts_d does not become the first threshold temperature Tth1 or more, so that it is possible to determine that the power generation is not permitted.

Accordingly, when the power generation permission determination of the SOFC 12 is performed based on both the stack temperature detection value Ts_d and the FC output voltage detection value Vfc_d, the FC connection relay 18 can be closed at a timing when the occurrence of the rush current can be restrained more surely.

Seventh Embodiment

The following describes the seventh embodiment. Note that an element similar to an element in the first to sixth embodiments has the same reference sign as used in the first to sixth embodiments, and a detailed description thereof is omitted. Particularly, the seventh embodiment and the aftermentioned eighth and ninth embodiments will describe respective aspects of controls after the FC connection relay 18 is closed by the start-time relay closing controls (see FIG. 4 to FIG. 6) described in the fourth to sixth embodiments.

Particularly, the present embodiment describes one aspect of a control on the vehicle power source system 100 (hereinafter also referred to as "SOFC stop related control") that is performed to stop the SOFC 12 in accordance with a predetermined power generation stop request when the power generation stop request is output during the operation of the SOFC 12 after the FC connection relay 18 is closed.

Figure 10:
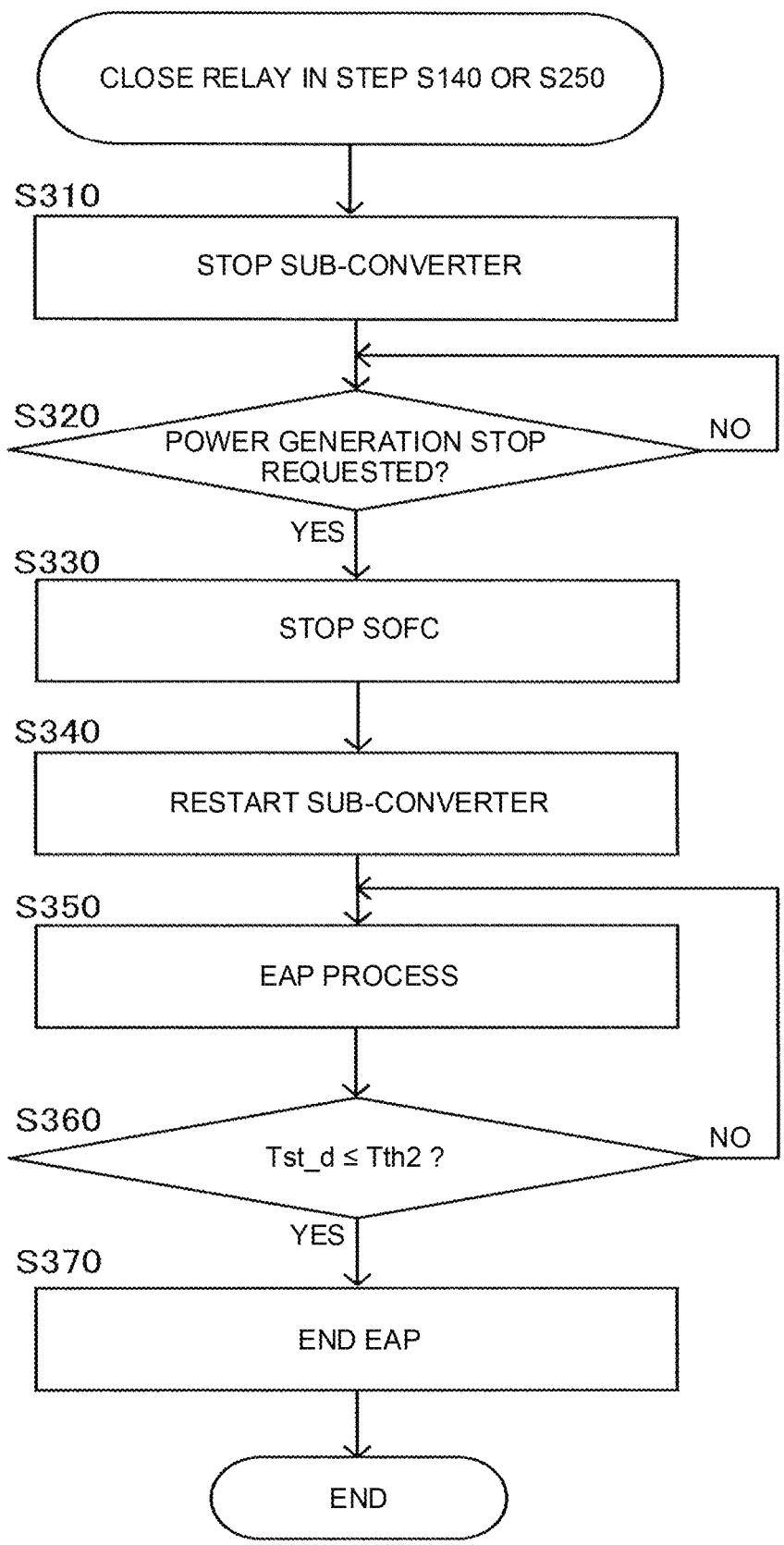
FIG. 10 is a flowchart to describe a procedure of an SOFC stop related control according to a seventh embodiment.

FIG. 10 is a flowchart illustrating a procedure of the SOFC stop related control according to the present embodiment.

As illustrated herein, when the FC connection relay 18 is closed in step S140 (see FIG. 4) or step S250 (see FIG. 6), the controller 90 executes the SOFC stop related control in step S310 and its subsequent steps.

In step S310, the controller 90 stops the sub-converter 26. For example, the controller 90 stops the sub-converter 26 generally at the same time as the closing of the FC connection relay 18 (triggered by the closing).

The sub-converter 26 is used in a charging control on the input-side capacitor 16a at the time of starting the SOFC 12, and the necessity to operate the sub-converter 26 during the operation of the SOFC 12 is basically low. Accordingly, like the present embodiment, by stopping the sub-converter 26 immediately in accordance with the closing of the FC connection relay 18, it is possible to restrain power consumption caused when the sub-converter 26 is kept operating unnecessarily.

In step S320, after the controller 90 stops the sub-converter 26 as described above, the controller 90 determines whether the power generation stop request to the SOFC 12 is output or not. More specifically, by detecting an operation of a predetermined SOFC stop operation switch (not shown), for example, the controller 90 determines that the power generation stop request is output.

In step S330, the controller 90 stops the SOFC 12. More specifically, the controller 90 outputs a command to stop an SOFC system including actuators for a fuel system and an air system to cause the SOFC 12 to generate power, for example. In accordance with this command, fuel supply to the SOFC 12 is stopped, and a stop sequence including a cooling process of the SOFC 12 is executed.

In step S340, the controller 90 restarts the sub-converter 26. This is to cause the sub-converter 26 to perform a control on an applied voltage in terms of an EAP (Electric Anode Protection) process (described later) to be performed to restrain oxidative degradation of an anode catalyst at the time of stopping the SOFC 12.

In step S350, the controller 90 executes the EAP process as a fuel cell protection process. Here, the EAP process is a process of supplying, to the SOFC 12, a current (hereinafter also referred to as "EAP current") with a predetermined magnitude in a scene where an anode of the SOFC 12 can enter the oxidative atmosphere at the time when the SOFC 12 is stopped, so that a protection voltage with a desired magnitude that is a voltage reverse to a voltage to be provided by the power generation of the SOFC 12 is applied to the SOFC 12.

Particularly, in the present embodiment, the sub-battery 22 is used as a power supply for the EAP process, and the EAP current is adjusted by the sub-converter 26. That is, in the present embodiment, the controller 90 controls the EAP current to a desired magnitude by controlling the sub-converter 26 such that power taken out from the sub-battery 22 is adjusted.

Note that, in the present embodiment, when the EAP process is executed, the FC connection relay 18 is closed, so that the EAP current can be supplied from the sub-battery 22 to the SOFC 12.

Further, the sub-converter 26 of the present embodiment is used for the execution of the EAP process in addition to charging to the input-side capacitor 16a at the time of starting the SOFC 12 as described in the fourth embodiment or the like. In view of this, it is desirable that the sub-converter 26 be configured to achieve a slightly large output in comparison with a case where the sub-converter 26 performs only the charging control on the input-side capacitor 16a, while the output is set to be smaller than the output of the FC converter 16.

Subsequently, in step S360, the controller 90 determines whether or not the stack temperature detection value Ts_d acquired from the stack temperature sensor 32 is a predetermined second threshold temperature Tth2 or less.

Here, there has been known such a fact that a reaction in which the catalyst in the anode oxidizes (more particularly, a reaction that produces nickel oxide) does not occur below an oxidative degradation point (e.g., a temperature between 400° C. to 500° C.). That is, the oxidative degradation point is a lower limit of the temperature at which the oxidative degradation in the anode occurs. Accordingly, when the temperature of the SOFC 12 decreases due to a cooling process included in the stop sequence of the SOFC 12 and becomes lower than the above temperature, the EAP process can be stopped. On this account, in the present embodiment, as a determination on whether the EAP process is stopped or not, it is determined whether or not the stack temperature detection value Ts_d is the second threshold temperature Tth2 or less.

Accordingly, it is preferable that the second threshold temperature Tth2 be set to the oxidative degradation point or a temperature around the oxidative degradation point.

When it is determined that the stack temperature detection value Ts_d is the second threshold temperature Tth2 or less, the controller 90 ends the EAP process in step S370. More specifically, the controller 90 controls the sub-converter 26 such that the EAP current is set to zero.

After the EAP process is ended, the controller 90 opens the FC connection relay 18 and stops the sub-converter 26 again appropriately.

The vehicle power source system 100 according to the seventh embodiment as described above yields the following effect.

In the vehicle power source system 100 of the present embodiment, when the controller 90 closes the FC connection relay 18, the controller 90 stops the sub-converter 26 (step S310 in FIG. 10).

Accordingly, it is possible to stop the sub-converter 26 immediately in accordance with the closing of the FC connection relay 18, and it is possible to restrain power consumption caused when the sub-converter 26 is kept operating unnecessarily.

Further, after the controller 90 stops the sub-converter 26 (step S310 in FIG. 10), the controller 90 determines whether the power generation stop request to the SOFC 12 is output or not (step S320 in FIG. 10). When it is determined that the power generation stop request to the SOFC 12 is output, the controller 90 stops the power generation of the SOFC 12 (step S330 in FIG. 10) and restarts the sub-converter 26 in a state where the FC connection relay 18 is kept closed (step S340 in FIG. 10). The controller 90 controls the restarted sub-converter 26 such that the EAP process as the fuel cell protection process of applying a predetermined voltage from the sub-battery 22 to the SOFC 12 is executed (step S350 in FIG. 10).

Hereby, when the EAP process is executed, the FC connection relay 18 is closed, so that the EAP current can be supplied from the sub-battery 22 to the SOFC 12. Since the EAP current is supplied from the sub-battery 22 to the SOFC 12 by use of the sub-converter 26, it is possible to execute the EAP process without providing other converters or batteries to execute the EAP process.

That is, the EAP process can be also executed by use of the sub-converter 26 for performing charging to the input-side capacitor 16$a$ as described in the fourth embodiment or the like, thereby making it possible to simplify the existing system configuration and to achieve both the start-time relay closing control and the EAP process at the time of stop or the like. Particularly, in comparison with the existing system in which the FC converter 16 is configured bidirectionally so as to execute the EAP process, it is possible to more simplify the system configuration.

Further, by executing the EAP process by use of the sub-converter 26, it is possible to eliminate the need for fuel gas supply (fuel gas purge) into the anode so as to eliminate the oxidative atmosphere, in a scene where the anode may enter the oxidative atmosphere at the time when, for example, the SOFC 12 is stopped. Accordingly, it is possible to achieve simplification of the existing system configuration and to achieve restraint of fuel consumption, thereby consequently making it possible to contribute to expansion of a cruising distance of the vehicle.

Further, the vehicle power source system 100 of the present embodiment includes the stack temperature sensor 32 (see FIG. 8) as a temperature acquisition portion for the fuel cell that is configured to acquire the stack temperature detection value Ts_d as the temperature of the SOFC 12. When the controller 90 determines that the stack temperature detection value Ts_d is the second threshold temperature Tth2 or less, the controller 90 ends the EAP process (step S360 and step S370 in FIG. 10).

Hereby, when the stack temperature Ts decreases to such an extent that catalytic oxidation in the anode is hard to occur, the EAP process can be ended immediately. This makes it possible to restrain power consumption of the EAP process.

Particularly, the second threshold temperature Tth2 is set to the oxidative degradation point as the temperature at which oxidative degradation in the anode of the SOFC 12 occurs. Hereby, the EAP process can be ended at a timing when the stack temperature Ts becomes lower than the oxidative degradation point at which catalytic oxidation in the anode does not occur theoretically. That is, since the EAP process can be ended at a more appropriate timing, it is possible to restrain power consumption of the EAP process and to more surely yield the effect of restraining oxidative degradation caused due to the EAP process.

Note that, in the present embodiment, the sub-converter 26 is stopped during the operation of the SOFC 12 (see step S310 in FIG. 10). However, the sub-converter 26 may be kept operating during the operation of the SOFC 12. Further, the SOFC stop related control in that case is performed similarly to the SOFC stop related control in FIG. 10 as described in the present embodiment except that the process of step S310 (stop of the sub-converter 26) and the process of step S340 (restart of the sub-converter 26) are omitted.

Eighth Embodiment

The following describes the eighth embodiment. Note that an element similar to an element in the first to seventh embodiments has the same reference sign as used in the first to seventh embodiments, and a detailed description thereof is omitted. The present embodiment particularly describes the SOFC stop related control in an aspect different from the SOFC stop related control described in the seventh embodiment.

Figure 11:
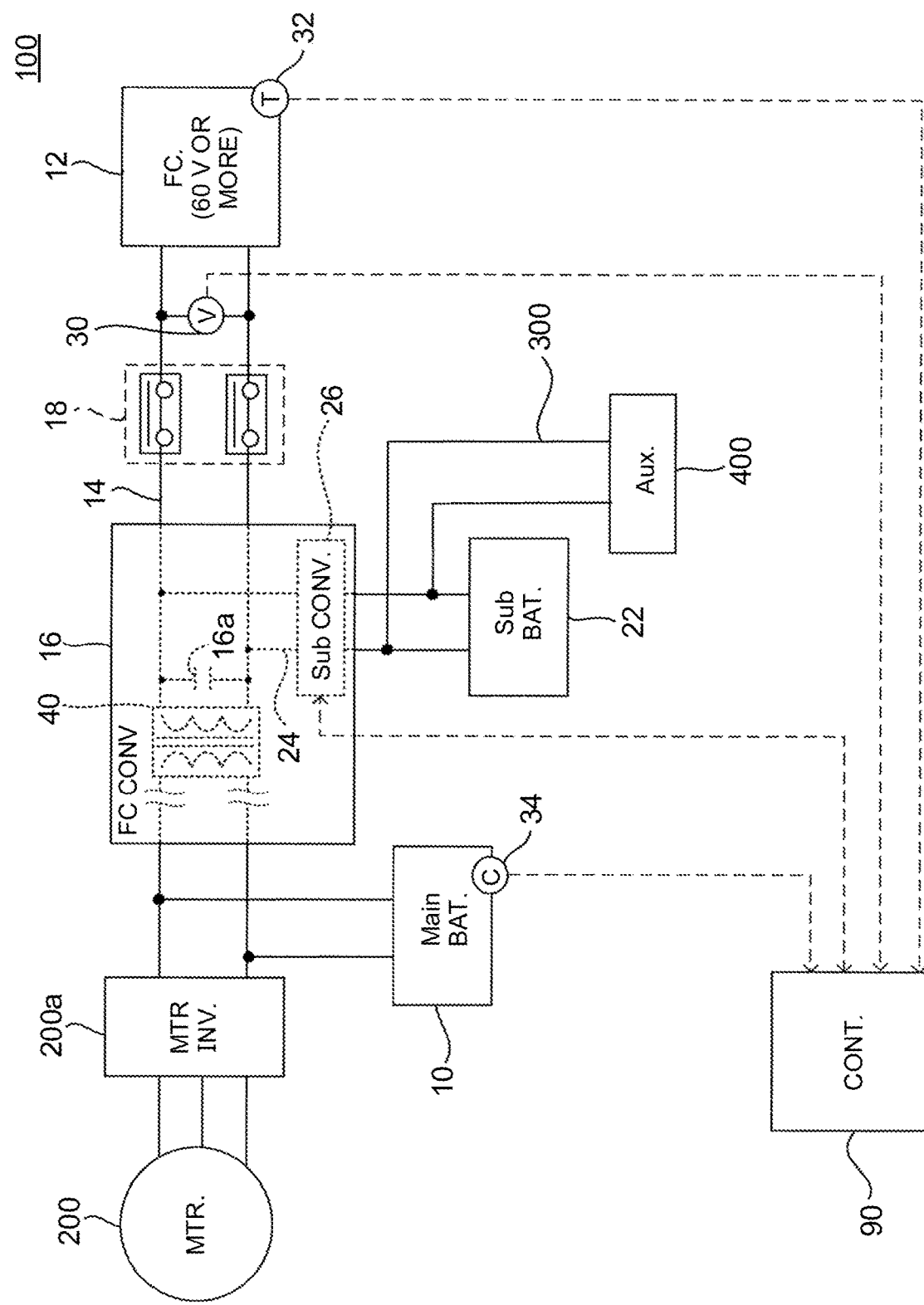
FIG. 11 is a view illustrating a configuration of a vehicle power source system according to an eighth embodiment.

FIG. 11 is a view illustrating a configuration of the vehicle power source system 100 according to the present embodiment. As illustrated herein, while the vehicle power source system 100 is based on the system configuration (see FIG. 3) described in the third embodiment, the main battery 10 is provided with an SOC sensor 34 configured to detect a charging amount (SOC) of the main battery 10.

The SOC sensor 34 detects a voltage and a charge/discharge current of the main battery 10, for example, and calculates the charging amount of the main battery 10 from accumulation values or the like of the voltage and the current. A charging amount detection value (hereinafter referred to as "charging amount detection value SOC_d") detected by the SOC sensor 34 is sent to the controller 90 appropriately.

Figure 12:
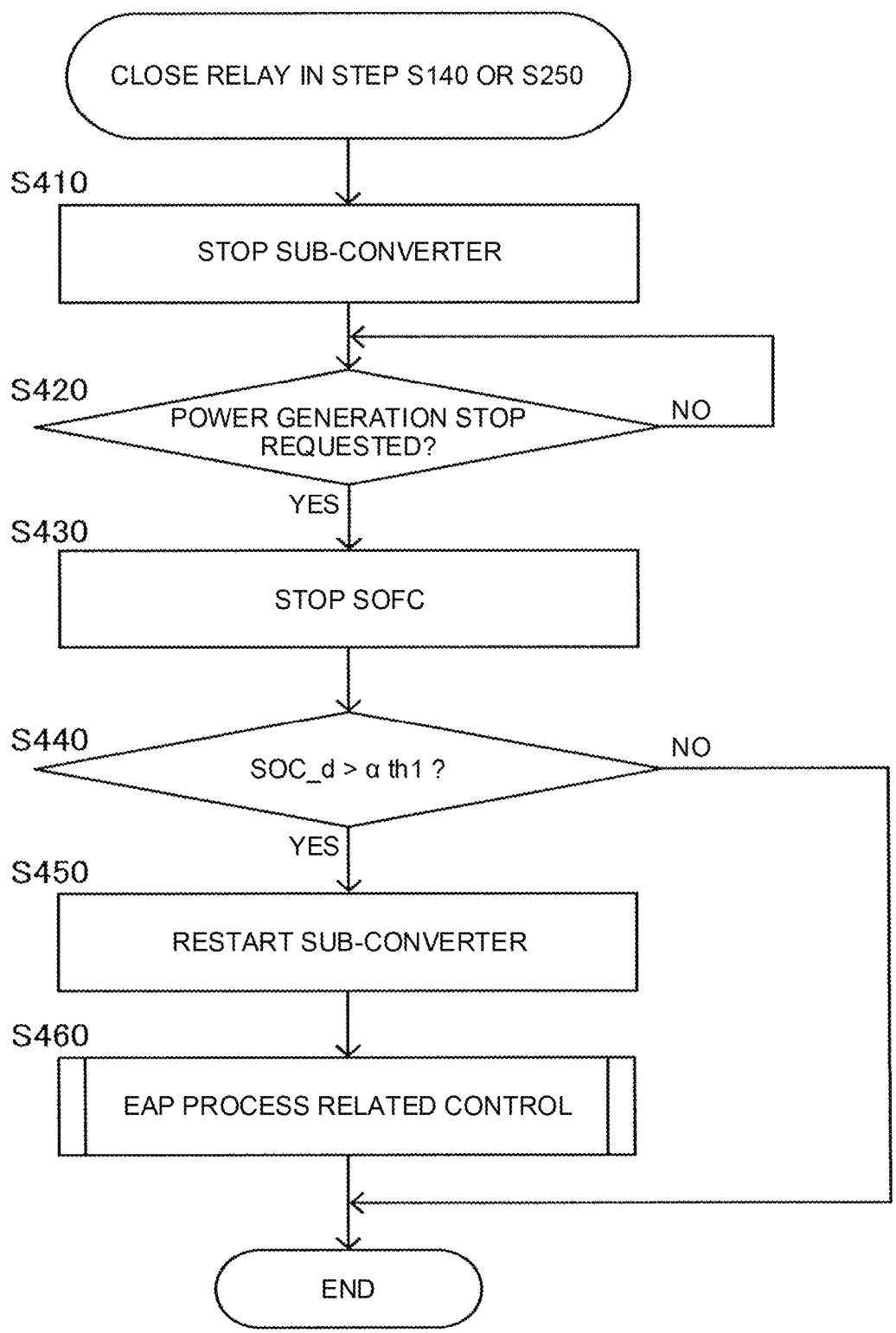
FIG. 12 is a flowchart to describe a procedure of an SOFC stop related control according to the eighth embodiment.

FIG. 12 is a flowchart illustrating a procedure of the SOFC stop related control according to the present embodiment.

As illustrated herein, when the FC connection relay 18 is closed in step S140 (see FIG. 4) or step S250 (see FIG. 6), the controller 90 executes processes of step S410 and its subsequent steps. Note that processes from step S410 to step S430 illustrated herein are similar to the processes from step S310 to step S330 in the seventh embodiment, so that detailed descriptions thereof are omitted.

When the power generation of the SOFC 12 is stopped in step S430, the controller 90 determines, in step S440, whether or not the charging amount detection value SOC_d acquired from the SOC sensor 34 exceeds a predetermined first charging amount threshold αth1.

Here, the first charging amount threshold αth1 is a threshold determined from the viewpoint of whether or not the main battery 10 is sufficiently charged with power to such an extent that power required for traveling or the like of the vehicle does not become insufficient for a predetermined time even if the SOFC 12 stops. That is, if the main battery 10 is charged with power to such an extent that the vehicle can travel for the predetermined time, it is considered that it takes a longer time before a power generation request is output to the SOFC12 again, and therefore, it is predicted that a power generation stop state of the SOFC 12 continues for a long time. Meanwhile, in a case where the power of the main battery 10 is insufficient to the power required for the vehicle to travel for the predetermined time, it is considered that it takes a shorter time before the power generation request is output to the SOFC12 again.

Accordingly, in the present embodiment, whether the subsequent EAP process is executed or not is determined depending on whether or not the power of the main battery 10 is insufficient to the power required for the vehicle to travel for the predetermined time.

More specifically, in a case where the power of the main battery 10 is sufficient to the power required for the vehicle to travel for the predetermined time, it is predicted that the power generation stop state of the SOFC 12 continues for a long time, so that a stop time of fuel supply to the SOFC 12 also becomes long. Hereby, a decrease in a fuel gas partial pressure inside the anode is promoted, so that the anode more easily enters the oxidative atmosphere. Accordingly, in this case, the need to execute the EAP process in order to restrain the oxidative degradation of the anode catalyst is high, so that the EAP process is executed (after "Yes" in step S440).

In the meantime, in a case where the power of the main battery 10 is insufficient to the power required for the vehicle to travel for the predetermined time, it is predicted that the power generation stop state of the SOFC 12 becomes relatively short, so that the stop time of fuel supply to the SOFC 12 also becomes relatively short. Hereby, the power generation request may be output again in a state where a decrease in the fuel gas partial pressure inside the anode is not promoted so much. Accordingly, in this case, the possibility that the decrease in the fuel gas partial pressure inside the anode is promoted to such an extent that the oxidative degradation of the anode catalyst is caused is low, and therefore, the EAP process is not executed from the viewpoint of restraining power consumption (after "No" in step S440).

Accordingly, when the controller 90 determines that the charging amount detection value SOC_d is the first charging amount threshold αth1 or less, the controller 90 ends the SOFC stop related control. In the meantime, when it is determined that the charging amount detection value SOC_d exceeds the first charging amount threshold αth1, the controller 90 executes the process of step S450.

In step S450, the controller 90 restarts the sub-converter 26. Then, the controller 90 executes an EAP process related control in subsequent step S460.

Figure 13:
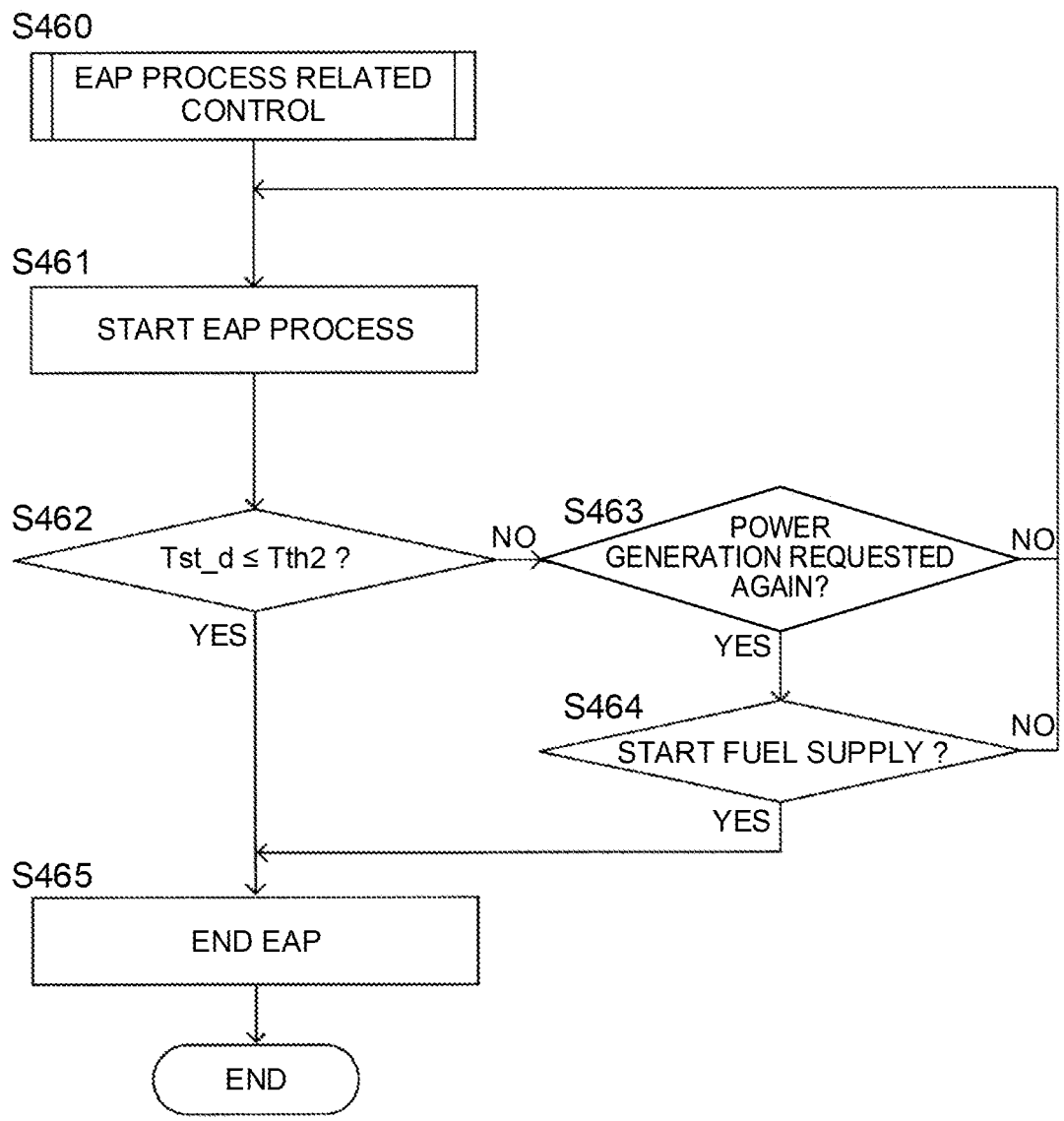
FIG. 13 is a flowchart to describe a procedure of an EAP process related control according to the eighth embodiment.

FIG. 13 is a flowchart illustrating details of the EAP process related control.

As illustrated herein, in step S461, the controller 90 starts the EAP process.

Subsequently, in step S462, the controller 90 determines whether or not the stack temperature detection value Ts_d is the second threshold temperature Tth2 or less. When it is determined that the stack temperature detection value Ts_d is the second threshold temperature Tth2 or less, the controller 90 ends the EAP process (step S465), similarly to the seventh embodiment.

In the meantime, when it is determined that the stack temperature detection value Ts_d exceeds the second threshold temperature Tth2, the controller 90 executes a determination process of step S463.

In step S463, the controller 90 determines whether the power generation request to the SOFC 12 is output again or not. When it is determined that the power generation request to the SOFC 12 is output again, the controller 90 executes a determination process of step S464.

In step S464, the controller 90 determines whether the fuel supply to the SOFC 12 is started or not. That is, at a stage where the start process of the SOFC 12 is performed based on the power generation request thus output again, the controller 90 determines whether the fuel supply to the SOFC 12 is started or not.

When it is determined that the fuel supply is started, the controller 90 proceeds to step S465 and ends the EAP process. That is, when the fuel supply to the SOFC 12 is started, the oxidative atmosphere in the anode disappears by the fuel supply, so that a state where the oxidative degradation of the anode catalyst is not caused substantially is formed. Accordingly, the EAP process is ended.

Note that, in the present embodiment, as seen from FIG. 13, on the premise that the stack temperature detection value Ts_d is not the second threshold temperature Tth2 or less ("No" in step S462), in a case where a negative determination is made in at least either one of the determination in step S463 on whether or not the power generation request is output again and the determination in step S464 on whether the fuel supply to the SOFC 12 is started or not, the EAP process is continued.

That is, in the present embodiment, even in a case where the stack temperature detection value Ts_d is not the second threshold temperature Tth2 or less, when the fuel supply to the SOFC 12 is started based on a start request output again to the SOFC 12, the EAP process is stopped. This makes it possible to restrain power consumption caused when the EAP process is continued unnecessarily.

The vehicle power source system 100 according to the eighth embodiment as described above yields the following effect.

The vehicle power source system 100 of the present embodiment further includes the SOC sensor 34 (FIG. 11) as the charging amount acquisition portion configured to acquire the charging amount of the main battery 10. After the controller 90 stops the sub-converter 26 (step S410 in FIG. 12), the controller 90 determines whether the power generation stop request to the SOFC 12 is output or not (step S420 in FIG. 12). When it is determined that the power generation stop request to the SOFC 12 is output, the controller 90 stops the power generation of the SOFC 12 (step S430 in FIG. 12) and determines whether or not the charging amount detection value SOC_d as a charging amount acquisition value of the main battery 10 exceeds the predetermined first charging amount threshold αth1 (step S440 in FIG. 12). When it is determined that the charging amount detection value SOC_d exceeds the first charging amount threshold αth1, the controller 90 restarts the sub-converter 26 in a state where the FC connection relay 18 is kept closed (step S450 in FIG. 12), and the controller 90 controls the restarted sub-converter 26 such that the EAP process of applying a predetermined voltage from the sub-battery 22 to the SOFC 12 is executed (step S460 in FIG. 12).

Hereby, when the EAP process is executed, the FC connection relay 18 is closed, so that the EAP current can be supplied from the sub-battery 22 to the SOFC 12. Since the EAP current is supplied from the sub-battery 22 to the SOFC 12 by use of the sub-converter 26, it is possible to execute the EAP process without providing other converters or batteries to execute the EAP process.

Further, in the present embodiment, when the charging amount detection value SOC_d of the main battery 10 exceeds the first charging amount threshold αth1, the sub-converter 26 is restarted to execute the EAP process. That is, in a case where the power of the main battery 10 is sufficient to the power required for the vehicle to travel for the predetermined time, the EAP process is executed.

Hereby, for example, in a case where the SOC of the main battery 10 is so low that it is considered that a restart of the SOFC 12 is requested in the predetermined time, such a possibility is high that the stopping time of the SOFC 12 is short and the decrease in the fuel gas partial pressure in the anode is not promoted to such an extent that the oxidative degradation of the anode catalyst occurs. Accordingly, in the present embodiment, it is possible to appropriately determine such a situation so as not to execute the EAP process. Accordingly, power consumption can be reduced by not executing the EAP process to the utmost.

Note that, for example, a travel time of the vehicle may be set or predicted after the SOFC 12 is stopped in accordance with step S430 in the present embodiment, a predicted value of power consumption required for the vehicle during the stop of the SOFC 12 may be calculated based on the set or predicted travel time of the vehicle, and the first charging amount threshold αth1 as a determination reference based on which it is determined whether or not the EAP process is performed may be determined based on the predicted value of power consumption.

Further, in the vehicle power source system 100 of the present embodiment, in a case where the power generation request to the SOFC 12 is output again ("Yes" in step S463 in FIG. 13), when the fuel supply to the SOFC 12 is started ("Yes" in step S464 in FIG. 13), the controller 90 ends the EAP process (step S465 in FIG. 13).

Hereby, when the fuel supply is started based on the power generation request output again to the SOFC 12, the EAP process is stopped, so that it is possible to restrain power consumption caused when the EAP process is continued unnecessarily. Particularly, like the present embodiment, even in a case where the stack temperature detection value Ts_d is not the second threshold temperature Tth2 or less, the EAP process is stopped in a state where the fuel supply is started in accordance with the power generation request to the SOFC 12 and the oxidative atmosphere in the anode disappears. This makes it possible to restrain power consumption caused when the EAP process is continued unnecessarily.

Ninth Embodiment

The following describes the ninth embodiment. Note that an element similar to an element in the first to eighth embodiments has the same reference sign as used in the first to eighth embodiments, and a detailed description thereof is omitted. The present embodiment describes an after-EAP-end control performed after the EAP process described in step S370 in FIG. 10 or step S460 in FIG. 12 is ended.

Figure 14:
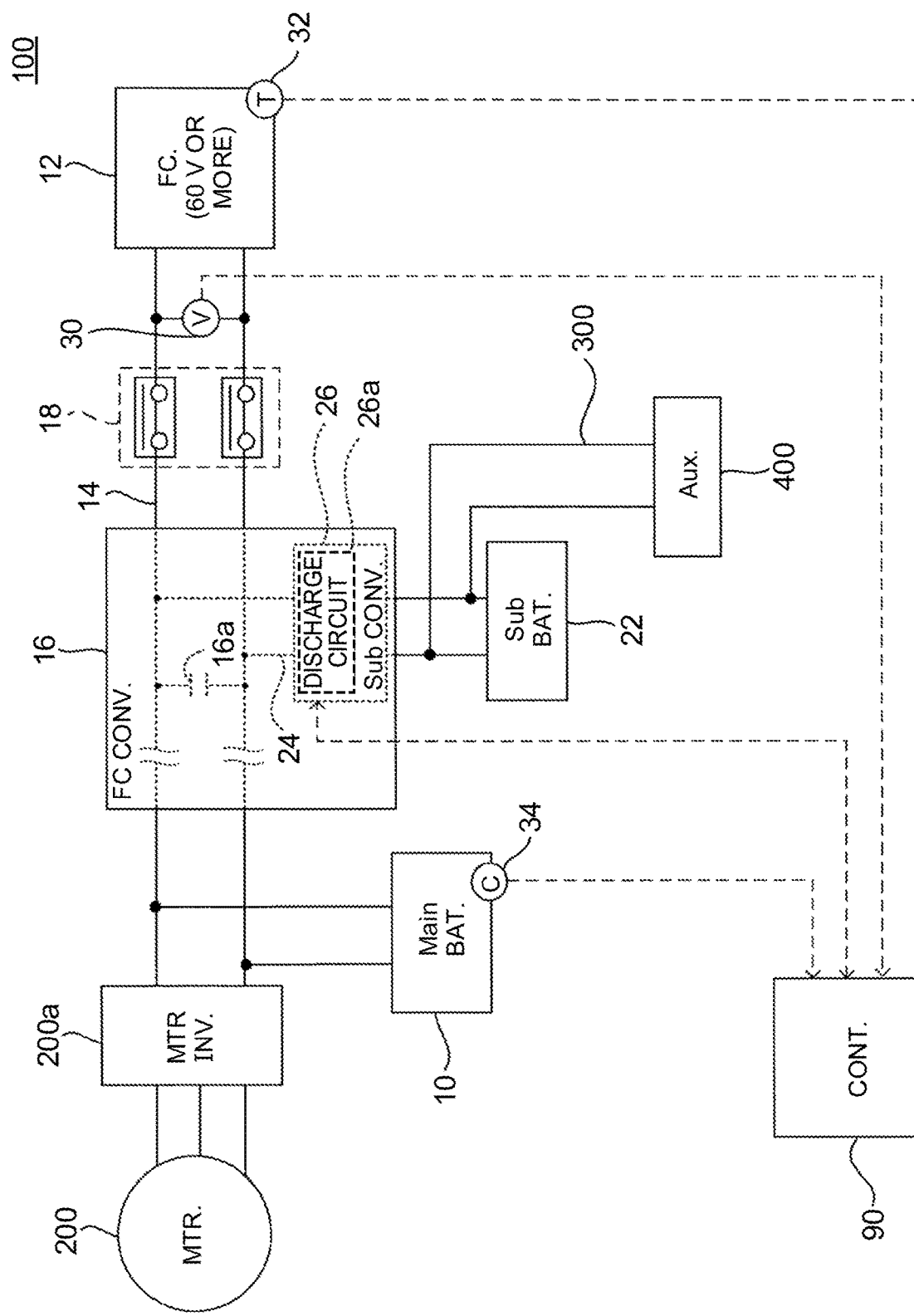
FIG. 14 is a view illustrating a configuration of a vehicle power source system according to a ninth embodiment.

FIG. 14 is a view illustrating a configuration of the vehicle power source system 100 according to the present embodiment. As illustrated herein, while the vehicle power source system 100 is based on the configuration in which the stack temperature sensor 32 and the SOC sensor 34 are provided in the system configuration (see FIG. 2) described in the second embodiment and the output of the SOFC 12 is 60V or more, a discharge circuit 26a is incorporated in the sub-converter 26. The discharge circuit 26a discharges charge power of the input-side capacitor 16a in response to a command from the controller 90.

Figure 15:
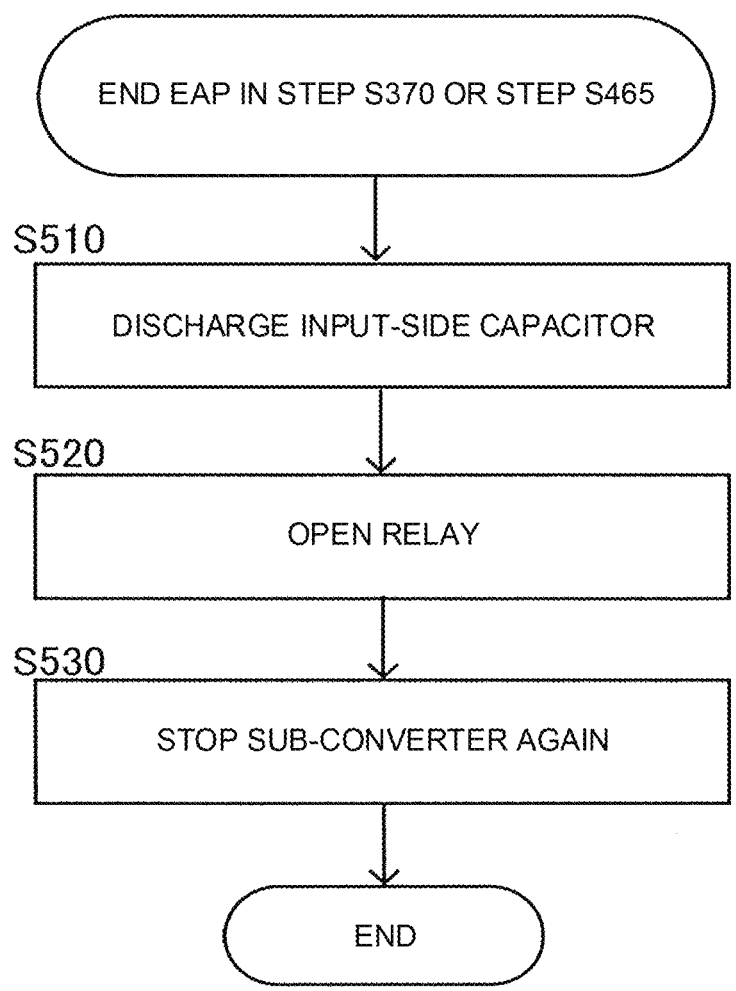
FIG. 15 is a flowchart to describe a procedure of an after-EAP-end control according to the ninth embodiment.

FIG. 15 is a flowchart illustrating a procedure of the after-EAP-end control of the present embodiment.

As illustrated herein, when the EAP process is ended in step S370 (see FIG. 10) or step S465 (see FIG. 12), the controller 90 executes the after-EAP-end control in step S510 and its subsequent steps.

In step S510, the controller 90 controls the sub-converter 26 such that the discharge circuit 26a discharges the charge power of the input-side capacitor 16a. Hereby, an input-side voltage of the FC converter 16 can be reduced more surely.

Particularly, in the present embodiment, since the output of the SOFC 12 is 60 V or more, it is desirable that the input-side voltage of the FC converter 16 be reduced immediately at the time when the vehicle or the SOFC 12 is stopped, for safety requirements. Accordingly, in the present embodiment, the discharge circuit 26a discharges the charge power of the input-side capacitor 16a, so that the safety requirements can be satisfied more appropriately.

When the discharge of the input-side capacitor 16a is finished, the controller 90 opens the FC connection relay 18 in step S520.

Then, in step S530, the controller 90 stops the sub-converter 26 again.

The vehicle power source system 100 according to the ninth embodiment as described above yields the following effect.

In the vehicle power source system 100 of the present embodiment, the sub-converter 26 includes the discharge circuit 26a (see FIG. 14). When the EAP process is ended, the controller 90 closes the FC connection relay 18 and causes the discharge circuit 26a of the sub-converter 26 to discharge power charged in the input-side capacitor 16a of the FC converter 16 (step S510 in FIG. 15). When the power of the input-side capacitor 16a is discharged, the controller 90 opens the FC connection relay 18 (step S520 in FIG. 15) and stops the sub-converter 26 (step S530 in FIG. 15).

Hereby, the input-side voltage of the FC converter 16 can be reduced more surely. Particularly, in the present embodiment, the discharge circuit 26a configured to discharge the input-side capacitor 16a is provided in the sub-converter 26 that can be configured to be small in comparison with the FC converter 16. Accordingly, in comparison with a case where the large FC converter 16 is configured as a bidirectional converter and the input-side capacitor 16a is discharged by use of the FC converter 16, for example, it is possible to reduce power consumption by the operation of the converter and to simplify the circuit configuration.

Note that the present embodiment describes an example in which the discharge circuit 26a is incorporated in the sub-converter 26 based on the configuration of the vehicle power source system 100 illustrated in FIG. 2. However, the present embodiment is not limited to this, and the discharge circuit 26a may be incorporated in the sub-converter 26 based on any of the configurations of the vehicle power source systems 100 illustrated in FIGS. 1, 3, 8, and 11.

The embodiments of the present invention have been described above, but the embodiments just show some applications of the present invention and are not intended to limit the technical scope of the present invention to the concrete configurations of the embodiments.

For example, the configurations of the vehicle power source system 100 illustrated in FIGS. 1 to 3, FIG. 8, FIG. 11, and FIG. 14 are just examples of a specific aspect that can achieve the present invention, and the present invention is not necessarily limited to these configurations. That is, the configuration of the vehicle power source system 100 is modifiable appropriately within the scope of the subject matter of the present invention.

Further, each of the above embodiments describes an example in which the charging portion of the sub-converter 26 is constituted by the input-side capacitor 16a. However, the charging portion may be constituted by any other circuit elements or circuit configurations conceivable by a person skilled in the art other than the capacitor, provided that the charging portion can adjust the input-side voltage of the sub-converter 26 in accordance with the output voltage of the SOFC 12.

Further, the vehicle power source system 100 of each of the embodiments describes an example in which the SOFC 12 is placed as a fuel cell. However, the present invention is also applicable appropriately to a vehicle power source system provided with a polymer electrolyte fuel cell, a fuel cell stack, or a lamination fuel cell in which fuel cells are laminated, other than the SOFC 12.

Note that the above embodiments can be combined appropriately. More specifically, the system configurations of the vehicle power source systems 100 described in the first to third embodiments, the start-time relay closing controls described in the fourth to sixth embodiments, the SOFC stop related controls described in the seventh and eighth embodiments, and the after-EAP-end control described in the ninth embodiment can be combined with each other appropriately.

Further, the start-time relay closing controls (see FIG. 6) described in the fifth and sixth embodiments describe an example in which, in accordance with the start-time relay closing control of the fourth embodiment, when the FC-capacitor voltage difference absolute value |ΔVfc_d-ic| is the threshold voltage difference ΔVth or less, the FC connection relay 18 is closed. However, the closing determination on the FC connection relay 18 based on whether or not the FC-capacitor voltage difference ΔVfc_d-ic is zero or more in the start-time relay closing control described in the modification of the fourth embodiment may be applied to the start-time relay closing controls described in the fifth and sixth embodiments.

The invention claimed is:

1. A vehicle power source system including:
   a main battery configured to supply power to a drive motor of a vehicle;
   a fuel cell configured to supply power at least to the main battery;
   a main line connecting the main battery and the fuel cell;
   a first voltage translator placed on the main line and including a charging portion and a voltage transforming portion, the first voltage translator being configured to boost an output voltage of the fuel cell;
   a relay provided between the charging portion and the fuel cell in the main line; and
   a sub-battery connected to an auxiliary machine power supply line via which power is supplied to an auxiliary machine of the vehicle or the fuel cell,
   the fuel cell and the relay being placed on an input side relative to the first voltage translator,
   the drive motor and the main battery being placed on an output side relative to the first voltage translator,
   the vehicle power source system comprising
   a second voltage translator connected between the relay and the charging portion on the input side of the first voltage translator in the main line and configured to adjust power to be supplied from the sub-battery to the charging portion.

2. The vehicle power source system according to claim 1, further comprising:
   a fuel cell output voltage acquisition portion configured to acquire an output voltage of the fuel cell; and
   a controller configured to execute an opening/closing control on the relay and a control on the second voltage translator based on the acquired output voltage of the fuel cell.

3. The vehicle power source system according to claim 2, wherein:
   the controller determines whether the fuel cell starts or not;
   when it is determined that the fuel cell starts, the controller performs charging from the sub-battery to the charging portion by controlling the second voltage translator; and
   after the charging to the charging portion, the controller closes the relay.

4. The vehicle power source system according to claim 3, wherein
   the controller performs the charging to the charging portion by controlling the second voltage translator so that a difference between a voltage of the charging portion and an output voltage of the fuel cell is a predetermined threshold voltage difference or less.

5. The vehicle power source system according to claim 4, wherein
   the controller performs the charging to the charging portion by controlling the second voltage translator so that the voltage of the charging portion is the output voltage of the fuel cell or less.

6. The vehicle power source system according to claim 3, wherein:
   the controller determines whether power generation of the fuel cell is permitted or not at a time of starting the fuel cell;
   when it is determined that the power generation of the fuel cell is permitted, the controller performs the charging to the charging portion by controlling the second voltage translator; and
   after the charging to the charging portion, the controller closes the relay.

7. The vehicle power source system according to claim 6, wherein:
   the controller performs the determination on whether the power generation of the fuel cell is permitted or not based on whether the output voltage of the fuel cell is a predetermined threshold voltage or more; and
   when the output voltage of the fuel cell is the threshold voltage or more, the controller determines that the power generation of the fuel cell is permitted.

8. The vehicle power source system according to claim 6, further comprising
   a fuel cell temperature acquisition portion configured to acquire a temperature of the fuel cell, wherein:
   the controller performs the determination on whether the power generation of the fuel cell is permitted or not based on whether or not the acquired temperature of the fuel cell is a predetermined first threshold temperature or more; and
   when the temperature of the fuel cell is the first threshold temperature or more, the controller determines that the power generation of the fuel cell is permitted.

9. The vehicle power source system according to claim 3, wherein
   when the controller closes the relay, the controller stops the second voltage translator.

10. The vehicle power source system according to claim 9, wherein:
    after the controller stops the second voltage translator, the controller determines whether a power generation stop request to the fuel cell is output or not;
    when it is determined that the power generation stop request to the fuel cell is output, the controller stops the power generation of the fuel cell and restarts the second voltage translator in a state where the relay is closed; and
    the controller controls the second voltage translator thus restarted and executes a fuel cell protection process of applying a predetermined voltage to the fuel cell from the sub-battery.

11. The vehicle power source system according to claim 9, further comprising
    a charging amount acquisition portion configured to acquire a charging amount of the main battery, wherein:

after the controller stops the second voltage translator, the controller determines whether a power generation stop request to the fuel cell is output or not;

when it is determined that the power generation stop request to the fuel cell is output, the controller stops the power generation of the fuel cell and determines whether or not the acquired charging amount of the main battery exceeds a predetermined first charging amount threshold;

when it is determined that the charging amount of the main battery exceeds the first charging amount threshold, the controller restarts the second voltage translator in a state where the relay is closed; and the controller controls the second voltage translator thus restarted and executes a fuel cell protection process of applying a predetermined voltage to the fuel cell from the sub-battery.

12. The vehicle power source system according to claim 11, wherein in a case where a power generation request to the fuel cell is output again, when fuel supply to the fuel cell is started, the controller ends the fuel cell protection process.

13. The vehicle power source system according to claim 11, further comprising a fuel cell temperature acquisition portion configured to acquire a temperature of the fuel cell, wherein when it is determined that the acquired temperature of the fuel cell is a second threshold temperature or less, the controller ends the fuel cell protection process.

14. The vehicle power source system according to claim 13, wherein the second threshold temperature is set to a temperature at which oxidative degradation in an anode of the fuel cell occurs.

15. The vehicle power source system according to claim 12, wherein:

the second voltage translator includes a discharge circuit;

when the fuel cell protection process is ended, the controller closes the relay and causes the discharge circuit to discharge power charged in the charging portion of the first voltage translator; and when the power of the charging portion is discharged, the controller opens the relay and stops the second voltage translator.

16. The vehicle power source system according to claim 1, wherein the second voltage translator is formed integrally with the first voltage translator.

17. The vehicle power source system according to claim 1, wherein the voltage transforming portion of the first voltage translator is constituted by a transformer.

18. The vehicle power source system according to claim 1, wherein the fuel cell is configured such that a maximum output voltage is less than 60 V.

* * * * *